United States Patent
Awasthi et al.

(10) Patent No.: US 12,051,138 B2
(45) Date of Patent: Jul. 30, 2024

(54) METHOD AND ELECTRONIC DEVICE FOR DESCRIPTION PARAMETER BASED MODIFICATION OF IMAGES

(71) Applicant: Samsung Electronics Co., Ltd., Gyeonggi-do (KR)

(72) Inventors: Saurabh Awasthi, Noida (IN); Garima Bedi, Noida (IN)

(73) Assignee: Samsung Electronics Co., Ltd (KR)

( * ) Notice: Subject to any disclaimer, the term of this patent is extended or adjusted under 35 U.S.C. 154(b) by 347 days.

(21) Appl. No.: 17/111,186

(22) Filed: Dec. 3, 2020

(65) Prior Publication Data

US 2021/0174565 A1     Jun. 10, 2021

(30) Foreign Application Priority Data

Dec. 6, 2019 (IN) .............................. 201941050343

(51) Int. Cl.
    *G06T 11/60*     (2006.01)
    *G06F 18/23*     (2023.01)
    *G06F 40/20*     (2020.01)
    *G06V 10/762*     (2022.01)
    *G06V 10/764*     (2022.01)

(52) U.S. Cl.
    CPC .............. *G06T 11/60* (2013.01); *G06F 18/23* (2023.01); *G06F 40/20* (2020.01); *G06V 10/762* (2022.01); *G06V 10/764* (2022.01)

(58) Field of Classification Search
CPC .... G06T 11/60; G06V 10/762; G06V 10/764; G06F 18/23; G06F 40/20
See application file for complete search history.

(56) References Cited

U.S. PATENT DOCUMENTS

| | | |
|---|---|---|
| 10,074,200 B1 | 9/2018 | Yeturu |
| 2016/0026900 A1 | 1/2016 | Ando |
| 2016/0132997 A1 | 5/2016 | Li et al. |
| 2017/0280058 A1 | 9/2017 | Liu et al. |
| 2019/0043172 A1 | 2/2019 | Chui et al. |
| 2019/0051057 A1 | 2/2019 | Sommerlade et al. |
| 2019/0268534 A1 | 8/2019 | Li |

OTHER PUBLICATIONS

Jianbo Chen et al., "Language-Based Image Editing with Recurrent Attentive Models", arXiv:1711.06288v2, Jun. 10, 2018, 12 pages.
International Search Report dated Mar. 3, 2021 issued in counterpart application No. PCT/KR2020/017332, 3 pages.

*Primary Examiner* — Manuchehr Rahmjoo
(74) *Attorney, Agent, or Firm* — The Farrell Law Firm, P.C.

(57) ABSTRACT

An electronic device and a method are provided for description parameter based modification of images. The method includes determining a description parameter associated with an image; determining a cluster including a portion related to the description parameter of the image to be modified; and modifying the portion of the image based on the description parameter.

16 Claims, 27 Drawing Sheets

FIG. 1
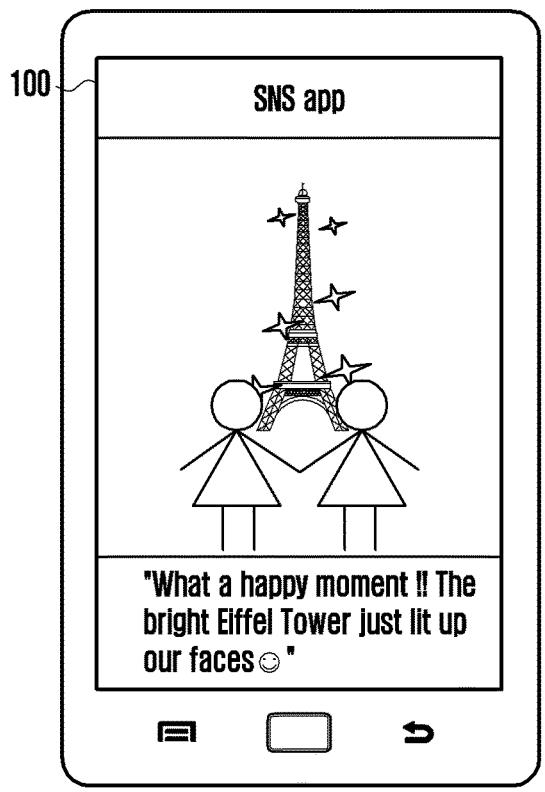
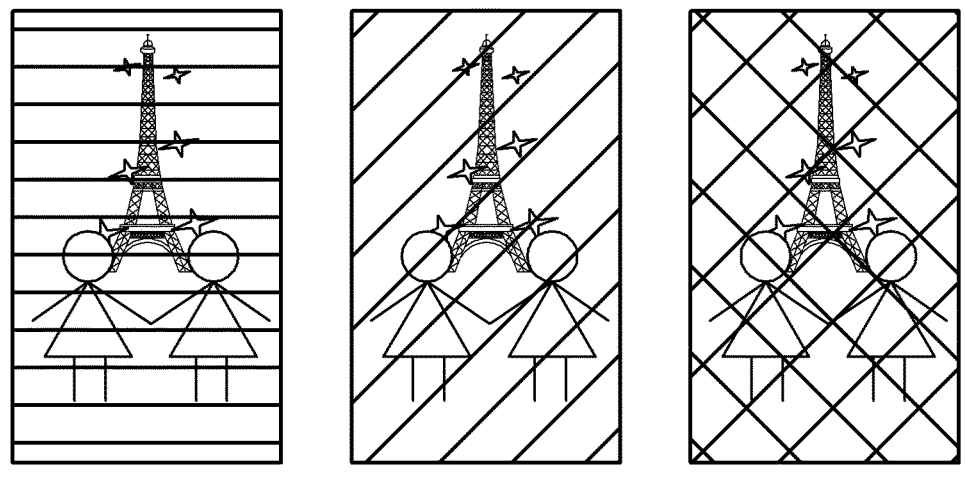
Available Solution (Filter)

FIG. 6A

| Image | User Descriptions | External Factors |
|---|---|---|
| 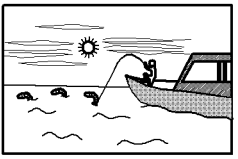 | • What a beautiful sunset !<br>• Water, fishes, boat & beautiful back ground!! I wish I could be there ☺<br>• Serene & beautiful. Would love to go there.<br>• Mesmerizing scene. Perfect sunset to view. | • Time : 07:06 PM<br>• Location : Busan Beach<br>• App Context : Instagram®, Facebook®<br>• Temperature : 26 °C |
| ⋮ | ⋮ | |
|  | • It is raining heavily here!!<br>• Rain droplets everywhere. Wet and dark atmosphere.<br>• Its raining. Don't forget to carry umbrellas ☺<br>• Its raining here. People are carring umbrellas today. | • Time : 12:10 PM<br>• Location : Suwon<br>• App Context : Instagram®, Whatsapp®<br>• Temperature : 19 °C |

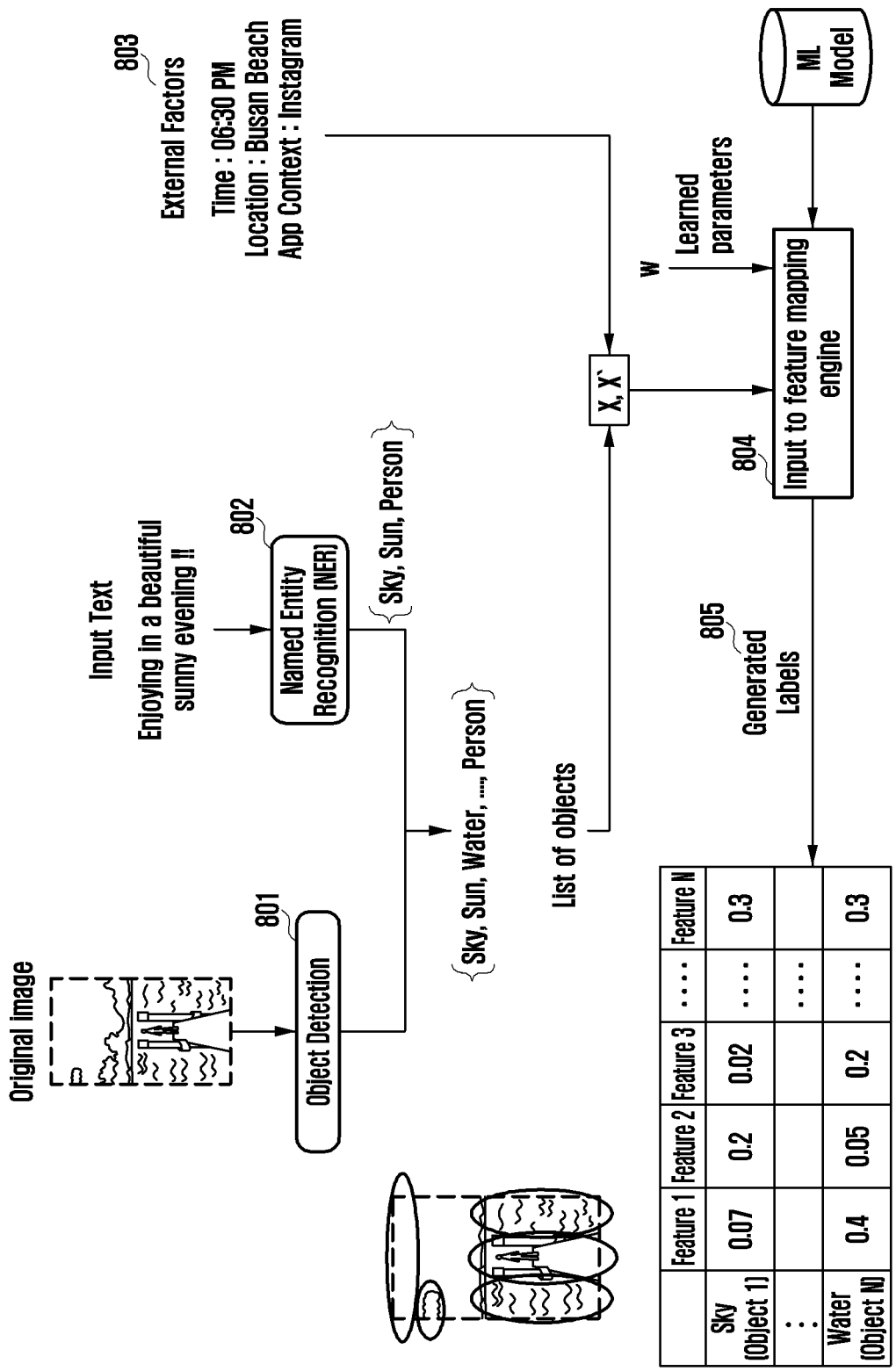

METHOD AND ELECTRONIC DEVICE FOR DESCRIPTION PARAMETER BASED MODIFICATION OF IMAGES

CROSS-REFERENCE TO RELATED APPLICATION(S)

This application is based on and claims priority under 35 U.S.C. § 119 to Indian Patent Application No. 201941050343, filed on Dec. 6, 2019, in the Indian Patent Office, the entire disclosure of which is incorporated herein by reference.

BACKGROUND

1. Field

The disclosure relates generally to performing actions in an electronic device, and more particularly, to a method and electronic device for description parameter based modification of images.

2. Description of Related Art

The use of electronic devices to access social media platforms has increased significantly over the last few years. Specifically, users share various aspects of their lives on the social media platforms with family and friends using images, videos, live streaming of events, audio, etc. Further, users may add text describing a story, user experience, user feelings, etc., associated with the images, the videos, etc.

A user may want to modify, for example, an image uploaded by the user, which may not be precise and may be a tedious process from the perspective of the user.

Some of the existing solutions include applying pre-defined filters provided in the social media platforms. However, the pre-defined filters automatically modify an entire image and also the pre-defined filters do not consider the text description provided by the user for the specific image for modifying the image. Therefore, a mismatch may occur between the text description provided by the user and the pre-defined filters selected to modify the image.

FIG. 1 illustrates a conventional process of modifying an image using pre-defined filters in an electronic device.

Referring to FIG. 1, if a user of an electronic device 100 has added an image of two people standing in front of the Eiffel Tower with the text description quoting "What a happy moment!! The bright Eiffel Tower just lit up our faces", the user may want to modify the image. Accordingly, the user checks the available filter options. However, irrespective of the filter option selected by the user, the filter option modifies the entire image and may not reflect the text description provided by the user.

SUMMARY

The disclosure has been made to address the above-mentioned problems and disadvantages, and to provide at least the advantages described below.

An aspect of the disclosure is to provide a method and apparatus for description parameter based modification of images.

Another aspect of the disclosure is to determine at least one description parameter associated with at least one image.

Another aspect of the disclosure is to determine a cluster comprising at least one portion of plurality of portions of the at least one image to be modified.

Another aspect of the disclosure is to generate a first descriptor for the cluster comprising the at least one portion of the plurality of portions of the at least one image to be modified.

Another aspect of the disclosure is to generate a second descriptor using the at least one description parameter associated with the at least one image.

Another aspect of the disclosure is to determine a loss factor by differentiating the first descriptor and the second descriptor.

Another aspect of the disclosure is to automatically modify the at least one portion of the at least one image based on the at least one description parameter.

In accordance with an aspect of the disclosure, a method is provided for description parameter based modification of images by an electronic device. The method includes determining a description parameter associated with an image; determining a cluster including a portion related to the description parameter of the image to be modified; and modifying the portion of the image based on the description parameter. In accordance with an aspect of the disclosure, an electronic device is provided for description parameter based modification of images. The electronic device includes a memory and a processor coupled to the memory. The processor is configured to determine a description parameter associated with an image; determine a cluster including a portion related to the description parameter of the image to be modified; and modify the portion of the image based on the description parameter.

BRIEF DESCRIPTION OF DRAWINGS

The above and other aspects, features, and advantages of certain embodiments of the disclosure will be more apparent from the following description taken in conjunction with the accompanying drawings, in which:

FIG. 1 illustrates a conventional process of modifying an image using pre-defined filters in an electronic device;

FIG. 6A illustrates data used for training an image to text descriptor engine, according to an embodiment;

FIG. 8 illustrates an example of inference of a functioning of an (image+text) to text descriptor engine of an electronic device in real-time, according to an embodiment;

DETAILED DESCRIPTION

Figure 2:
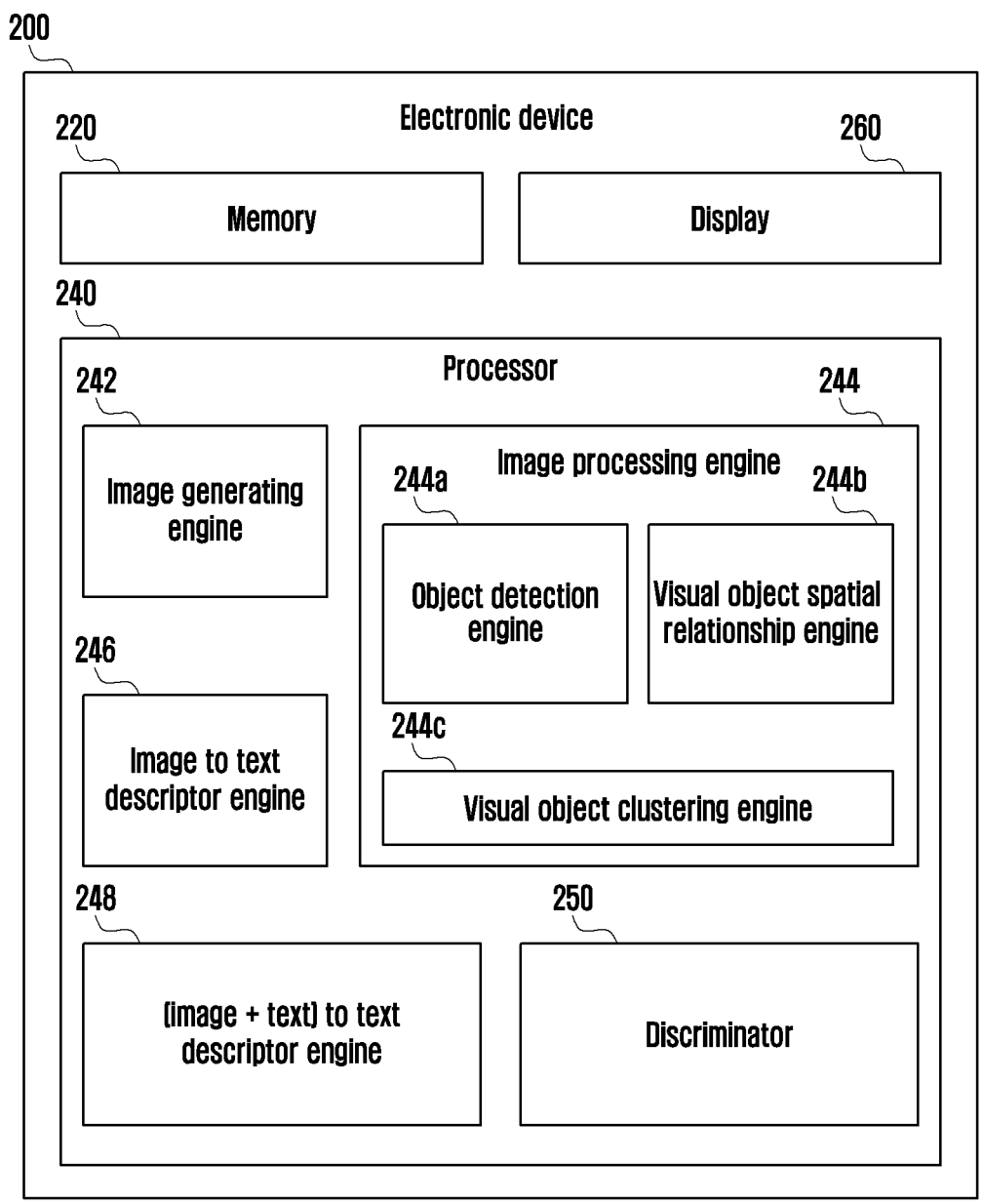
FIG. 2 illustrates an electronic device for description parameter based modification of images, according to an embodiment.

Various embodiments of the disclosure will be described in detail below with reference to the accompanying drawings. In the following description, specific details such as detailed configuration and components are merely provided to assist the overall understanding of these embodiments of the disclosure. Therefore, it should be apparent to those skilled in the art that various changes and modifications of the embodiments described herein can be made without departing from the scope and spirit of the disclosure.

In addition, descriptions of well-known functions and constructions are omitted for clarity and conciseness. Also, the various embodiments described herein are not necessarily mutually exclusive, as some embodiments can be combined with one or more other embodiments to form new embodiments.

Herein, the term "or" as used herein, refers to a non-exclusive or, unless otherwise indicated.

The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units, engines, manager, modules, etc., are physically implemented by analog and/or digital circuits such as logic gates, integrated circuits, microprocessors, microcontrollers, memory circuits, passive electronic components, active electronic components, optical components, hardwired circuits, etc., and may optionally be driven by firmware and/or software. The circuits may, for example, be embodied in one or more semiconductor chips, or on substrate supports such as printed circuit boards, etc. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for description parameter based modification of images by an electronic device. The method includes determining, by the electronic device, at least one description parameter associated with at least one image and determining, by the electronic device, a cluster including at least one portion of plurality of portions of the at least one image to be modified. The at least one portion is related to at least one description parameter. Further, the method includes automatically modifying, by the electronic device, the at least one portion of the at least one image based on the at least one description parameter.

FIG. 2 illustrates an electronic device for description parameter based modification of images, according to an embodiment.

Referring to FIG. 2, an electronic device 200, such as a mobile phone, a smart phone, Personal Digital Assistant (PDA), a tablet, a wearable device, a flexible device, etc., includes a memory 220, a processor 240 and a display 260.

The memory 220 can include non-volatile storage elements, such as magnetic hard discs, optical discs, floppy discs, flash memories, or forms of electrically programmable memories (EPROM) or electrically erasable and programmable (EEPROM) memories. The memory 220 may also be considered a non-transitory storage medium. The term "non-transitory" may indicate that the storage medium is not embodied in a carrier wave or a propagated signal. However, the term "non-transitory" should not be interpreted that the memory 220 is non-movable. A non-transitory storage medium may store data that can, over time, change (e.g., in Random Access Memory (RAM) or cache).

The memory 220 may be configured to store large amounts of information.

The processor 240 includes an image generating engine 242, an image processing engine 244, an image to text descriptor engine 246, an (image text) to text descriptor engine 248, and a discriminator 250.

The image generating engine 242 is configured to receive at least one image, at least one description parameter associated with the at least one image, and contextual parameters, and automatically generate at least one modified image using the at least one image, the at least one description parameter associated with the at least one image, and the contextual parameters. The at least one description parameter associated with at least one image may include a text input, a hashtag, a symbol, an emoticon, a label, a voice input, a contextual parameter, an image description, tagged locations, or any combination thereof. Automatically modifying may include modifying at least one visual parameter associated with the at least one portion of the at least one image, adding an object related to the at least one description parameter, removing an object based on the at least one description parameter, replacing an object based on the at least one description parameter, etc. The contextual parameters may be external factors such as current time, temperature, weather conditions, location, application context, etc. The terms "contextual parameters" and "external factors" may be used interchangeably in the disclosure and mean the same.

In a second iteration of modifying the image, the image generating engine 242 may modify the image based on a back propagation loss factor received from the discriminator 250.

The image processing engine 244 includes an object detection engine 244a, a visual object spatial relationship engine 244b, and a visual object clustering engine 244c. The image processing engine 244 is configured to process the image and perform image segmentation on the image. The image processing engine 244 also performs object detection to determine the objects in the image, e.g., clouds, the sky, a bridge, a person, etc. The image processing engine 244 may use any existing object detection technique for detecting the objects in the image, such as a You Only Look Once (POLO) algorithm, a region-convolution neural network (R-CNN), Retinanet, Single Shot MultiBox Detector (SSD), etc. The segmented image is then provided to the image to text descriptor engine 246 to generate clusters of objects which are visually related to each other. The image processing engine 244 is configured to identify the cluster including the at least one portion of the plurality of portions which are visually co-related in the image.

The image to text descriptor engine 246 is configured to modify the at least one portion of the plurality of portions of the at least one image based on the at least one description parameter received. Further, the image to text descriptor engine 246 is configured to determine a vector representation for a description of the cluster. The cluster including the at least one portion of the plurality of portions which are visually co-related is identified by the image to text descriptor engine 246 by determining the at least one portion of the plurality of portions and at least one object from the at least one image based on the at least description parameter and determining a spatial relationship between one of at least two portion of the plurality of portions and the at least one object from the at least one image.

Further, the image to text descriptor engine 246 is configured to generate the cluster including at the at least one portion of the plurality of portions and at least one object from the at least one image which are co-related based on the at least one description parameter.

The image to text descriptor engine 246 is configured to generate the first descriptor for the cluster based on the vector representation.

The (image+text) to text descriptor engine 248 is configured to generate the second descriptor using the at least one description parameter associated with the at least one image, the at least one image, and the external factors. The (image+text) to text descriptor engine 248 determines visual attributes associated with the at least one image using at least one of the at least one image, an image driven natural language processing (NLP), and contextual parameters associated with the at least one image. The visual attributes associated with the at least one image are to be modified based on the at least one description parameter. Further, the (image+text) to text descriptor engine 248 generates the second descriptor using the visual attributes associated with the at least one image that are to be modified based on the at least one description parameter.

The discriminator 250 is configured to determine a loss factor by differentiating the first descriptor and the second descriptor, and is configured to determine whether the loss factor obtained by differentiating the first descriptor and the second descriptor is within a loss threshold. The loss threshold is defined using quality parameters based on specific use case and scenario. In response to determining that the loss factor obtained by differentiating the first descriptor and the second descriptor is less than the loss threshold, the discriminator 250 is configured to modify the at least one portion of the at least one image based on the determined loss factor.

In response to determining that the loss factor obtained by differentiating the first descriptor and the second descriptor is greater than the loss threshold, the discriminator 250 is configured to provide a back propagation of the loss factor to regenerate the first descriptor for the cluster comprising the at least one portion of the plurality of portions in the at least one image to be modified. The discriminator 250 is configured to regenerate the first descriptor for the cluster including the at least one portion of the plurality of portions in the at least one image. The discriminator 250 re-modifies the cluster comprising the at least one portion of the plurality of portions in the at least one image to be modified based on the at least one description parameter and the back propagated loss factor, and re-generates the first descriptor for the cluster based on the vector representation.

The display 260 is configured to display the automatically modified at least one portion of the at least one image based on the at least one description parameter.

Although FIG. 2 illustrates various hardware elements of the electronic device 200, embodiments are not limited thereto. For example, the electronic device 200 may include fewer or more elements. Further, the labels and/or names of the elements are used only for illustrative purposes and do not limit the scope of the disclosure one or more components can be combined together to perform same or substantially similar function. Further, a method for description parameter based modification of images by the electronic device 200 can be performed by or a combination of machine learning (ML) and artificial intelligence (AI) model which is configured for performing actions such as image/video processing.

Figure 3:
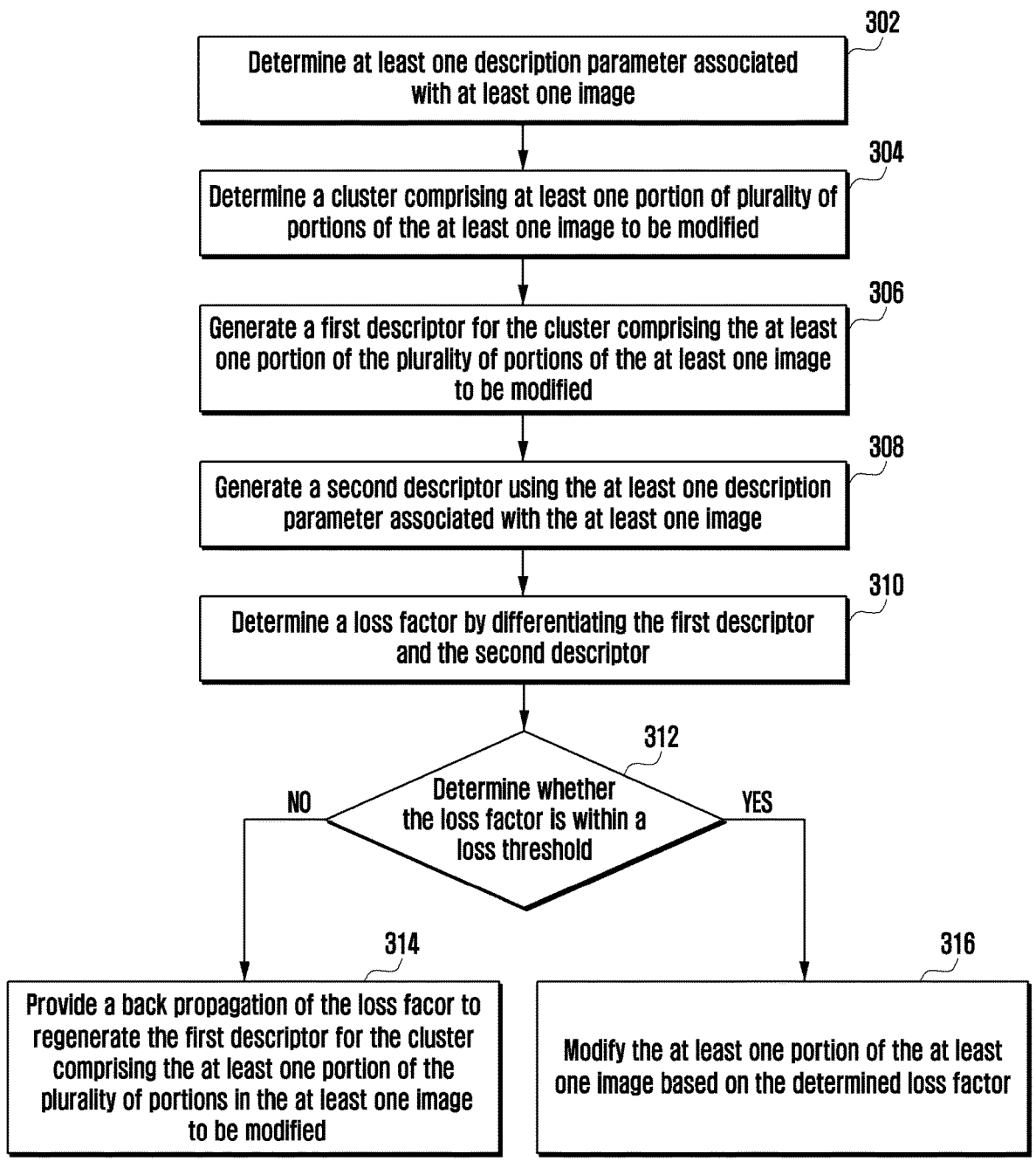
FIG. 3 is a flow chart illustrating a method for description parameter based modification of images by an electronic device, according to an embodiment.

FIG. 3 is a flow chart illustrating a method for description parameter based modification of images by an electronic device, according to an embodiment. For example, the description of FIG. 3 will be provided below as being performed by the electronic device 200 of FIG. 2.

Referring to FIG. 3, at step 302, the electronic device 200 determines the at least one description parameter associated with at least one image. For example, the processor 240 can determine the at least one description parameter associated with at least one image.

At step 304, the electronic device 200 determines the cluster including at least one portion of the plurality of portions of the at least one image to be modified. For example, the processor 240 can determine the cluster including at least one portion of the plurality of portions of the at least one image to be modified.

At step 306, the electronic device 200 generates the first descriptor for the cluster including the at least one portion of the plurality of portions of the at least one image to be modified. For example, the processor 240 can generate the first descriptor for the cluster including the at least one portion of the plurality of portions of the at least one image to be modified.

At step 308, the electronic device 200 generates the second descriptor using the at least one description parameter associated with the at least one image. For example, the processor 240 can generate the second descriptor using the at least one description parameter associated with the at least one image.

At step 310, the electronic device 200 determines the loss factor by differentiating the first descriptor and the second descriptor. For example, the processor 240 can determine the loss factor by differentiating the first descriptor and the second descriptor.

At step 312, the electronic device 200 determines whether the loss factor is within the loss threshold. For example, the processor 240 can determine whether the loss factor is within the loss threshold.

At step 314, in response to determining that the loss factor is not within the loss threshold, the electronic device 200 provides the back propagation of the loss factor to regenerate the first descriptor for the cluster including the at least one portion of the plurality of portions in the at least one image to be modified. For example, the processor 240 can provide the back propagation of the loss factor to regenerate the first descriptor for the cluster including the at least one portion of the plurality of portions in the at least one image to be modified, in response to determining that the loss factor is not within the loss threshold.

At step 316, in response to determining that the loss factor is within the loss threshold, the electronic device 200 modifies the at least one portion of the at least one image based on the determined loss factor. For example, the processor 240 can modify the at least one portion of the at least one image based on the determined loss factor, in response to determining that the loss factor is within the loss threshold.

The various actions, acts, blocks, steps, etc., illustrated in FIG. 3 may be performed in the order presented, in a different order, or simultaneously. Further, in some embodiments, some of the actions, acts, blocks, steps, etc., may be omitted, added, modified, skipped, etc., without departing from the scope of the disclosure.

Figure 4A:
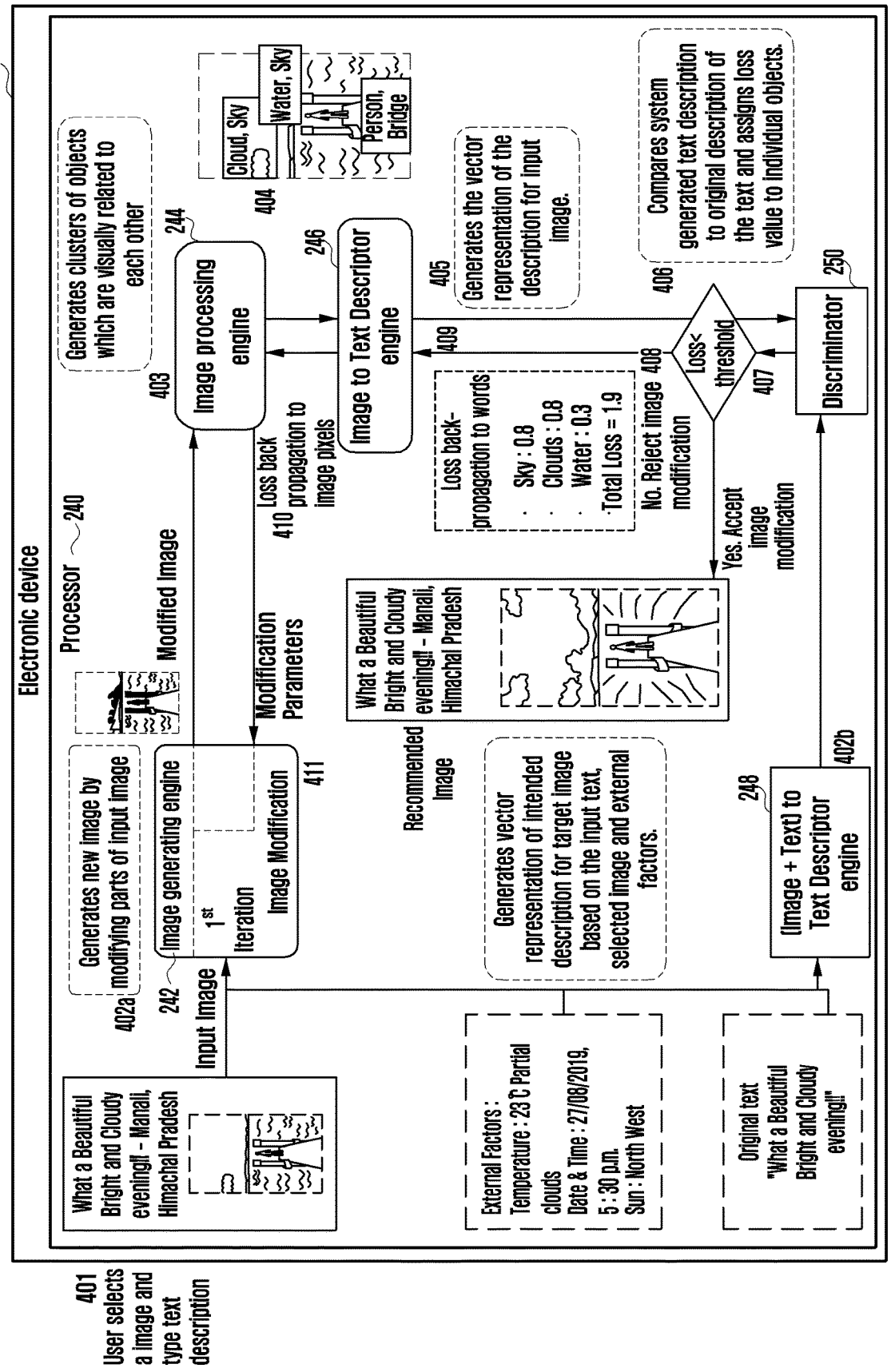
FIGS. 4A and 4B illustrate a method for description parameter based modification of images by an electronic device, according to an embodiment.
Figure 4B:
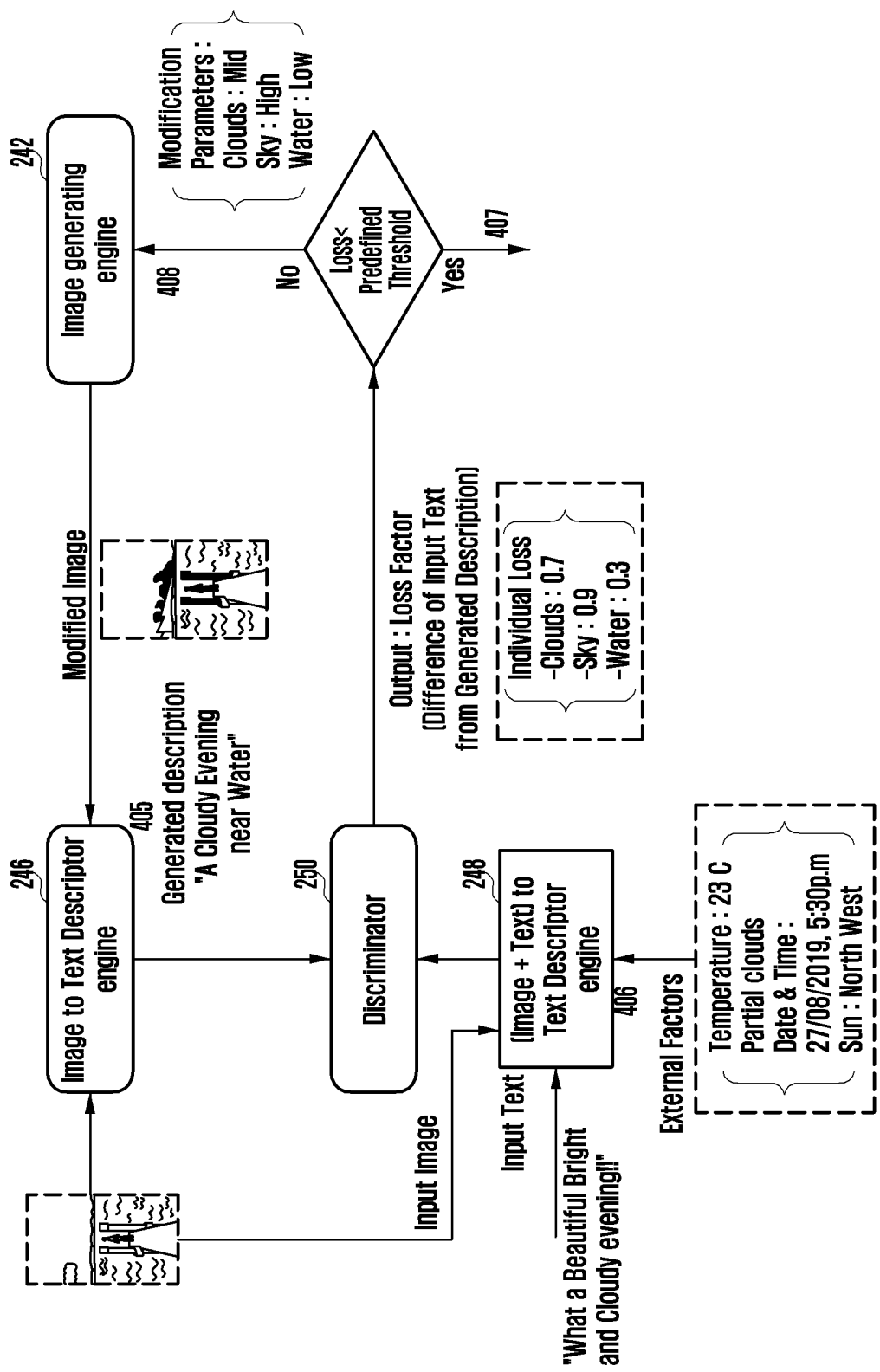

FIGS. 4A and 4B illustrate a method for description parameter based modification of images by an electronic device, according to an embodiment. For example, the description of FIGS. 4A and 4B will be provided below with reference to the electronic device 200 of FIG. 2.

Referring to FIGS. 4A and 4B, at step 401, a user selects an input image from the electronic device 200 for uploading to a social networking platform and types text describing the input image selected by the user as "*What a Beautiful Bright and Cloudy evening!!—Manali, Himachal Pradesh*".

At step 402a, the image generating engine 242 of the processor 240 generates a modified image by modifying certain portions of the input image by using the input image, the text description, and the external factors determined by the electronic device 200. However, in case of the first iteration the image generating engine 242 of the processor 240 does not modify the input image and provides the same input image to the image processing engine 244, as the back propagation loss required to perform the modifications in the input image in case of the first iteration is '0'.

At step 403, the modified image is fed to the image processing engine 244 which first performs object detection to determine the objects in the modified image. The image processing engine 244 also determines the clusters of objects which are visually related to each other in the modified image.

At step 404, the image processing engine 244 determines the plurality of clusters in the modified image which includes a first cluster of objects include the cloud and the sky, a second cluster of objects includes the water and the sky, a third cluster of objects includes the bridge and the person, etc.

At step 405, the image to text descriptor engine 246 generates a description for the modified image based on the input image and the modified image as "A cloudy evening near water" (as illustrated in FIG. 4B). The image to text descriptor engine 246 may generates the vector representation of the text description for the modified input image for the plurality of clusters as described in Table 1 below.

TABLE 1

|        | Brightness | Visibility | Reflection | ... | Sharpness |
|--------|-----------|-----------|-----------|-----|-----------|
| Sky    | 0.4       | 0.6       | 0         |     | 0.2       |
| Clouds | 0.2       | 0.5       | 0         |     | 0.1       |
| Water  | 1         | 1         | 0.1       |     | 1         |

At step 402b, the (image+text) to text descriptor engine 248 receives the external factors, such as a temperature of 23° C. with partial clouds, date and time of Aug. 27, 2019, at 5:30 pm, and a location of the sun of North West, along with the text description provided by the user and the input image. Further, the (image+text) to text descriptor engine 248 may generate the vector representation of the intended description for the input image based on the text description provided by the user, the input image, and the external factors as shown in Table 2 below.

TABLE 2

|        | Brightness | Visibility | Reflection | ... | Sharpness |
|--------|-----------|-----------|-----------|-----|-----------|
| Sky    | 0.8       | 0.9       | 0         |     | 0.4       |
| Clouds | 0.7       | 0.8       | 0         |     | 0.6       |

At step 406, the discriminator 250 receives the vector representation from both the (image+text) to text descriptor engine 248 and the image to text descriptor engine 246. The discriminator 250 compares the text description generated by the electronic device 200 with the text description provided by the user and determines the loss value of the objects determined in the plurality of clusters.

At step 407, the discriminator 250 determines whether the loss value is below a certain threshold for the loss for the modified image to be accepted as the final modified image. In response to determining that the loss value is below the certain threshold for the loss, the modified image is accepted as the final modified image and uploaded to the social networking platform. In response to determining that the loss value is not below the certain threshold for the loss, at step 408, the image modification performed at step 402a is rejected and the loss factor is generated by the discriminator 250 as shown in Table 3 below,

TABLE 3

| Object | Loss factor |
|---|---|
| Sky | 0.8 |
| Clouds | 0.8 |
| Water | 1.9 |
| Total loss | 1.9 |

At step 409, the loss factor is back-propagated to words to the image to text descriptor engine 246.

At step 410, the loss factor back-propagation is performed to image pixels, by the image processing engine 244. The image processing engine 244 generates the image modification parameters based on the loss factor, which is then transmitted to the image generating engine 242, which again modifies the modified image (first modification iteration) and repeats the steps 403 to 407 until the modified image is accepted. Therefore, in the method of FIGS. 4A and 4B, the electronic device 200 performs multiple modification iterations on the input image in order to modify the related portions of the input image based on the external factors, the input image itself, and the text description provided by the user.

Figure 5A:
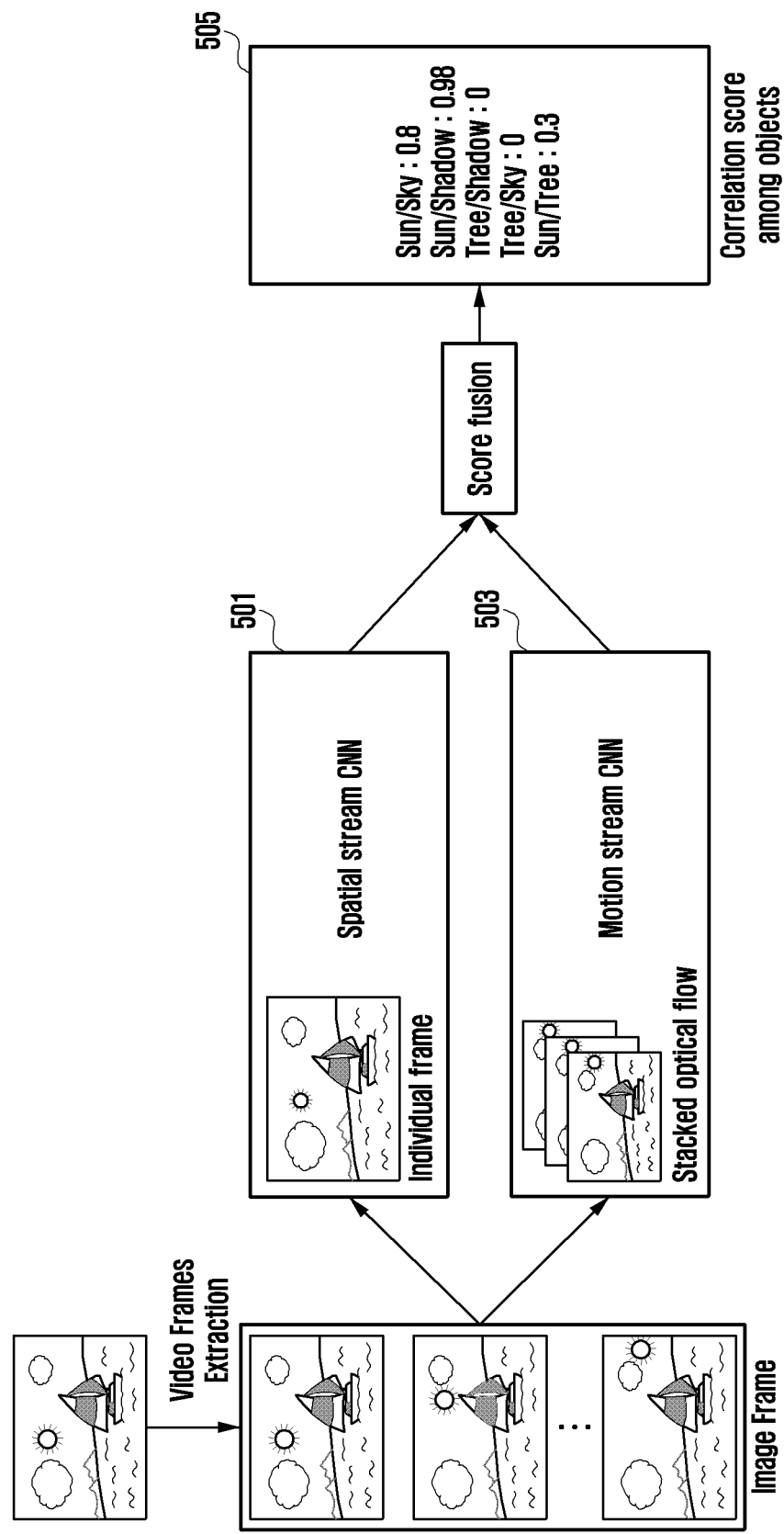
FIG. 5A illustrates a visual object spatial relationship engine of an image processing engine, according to an embodiment.

FIG. 5A illustrates a visual object spatial relationship engine of an image processing engine, according to an embodiment.

Referring to FIG. 5A, the visual object spatial relationship engine, which is neural network, is trained on the image frames extracted from videos of scenes in order to determine visual relationship among the objects present in the extracted frames. The visual object spatial relationship engine identifies the spatial stream and the motion stream of the objects in the extracted frames. The visual object spatial relationship engine includes a spatial stream CNN 501, which analyzes individual frames and determines how the individual objects in the individual frames change in the plurality of frames, i.e., the spatial relationship among the objects. For example, in FIG. 5A, the plurality of frames of the video are analyzed to determine the location of the sun in each frame.

The visual object spatial relationship engine includes a motion stream CNN 503, which analyzes the individual objects over a period of time. For example, in FIG. 5A, the plurality of frames of the video are analyzed to determine that the sun in moving from left to right in the subsequent frames, the impact of motion of the sun on shadows over other objects, brightness impact, etc.

Further, a correlation score 505 is generated using the output from both the motion stream CNN and the spatial stream CNN for the objects in the image frames of the video clip. A higher correlation score represents high correlation between the plurality of objects in the image.

Figure 5B:
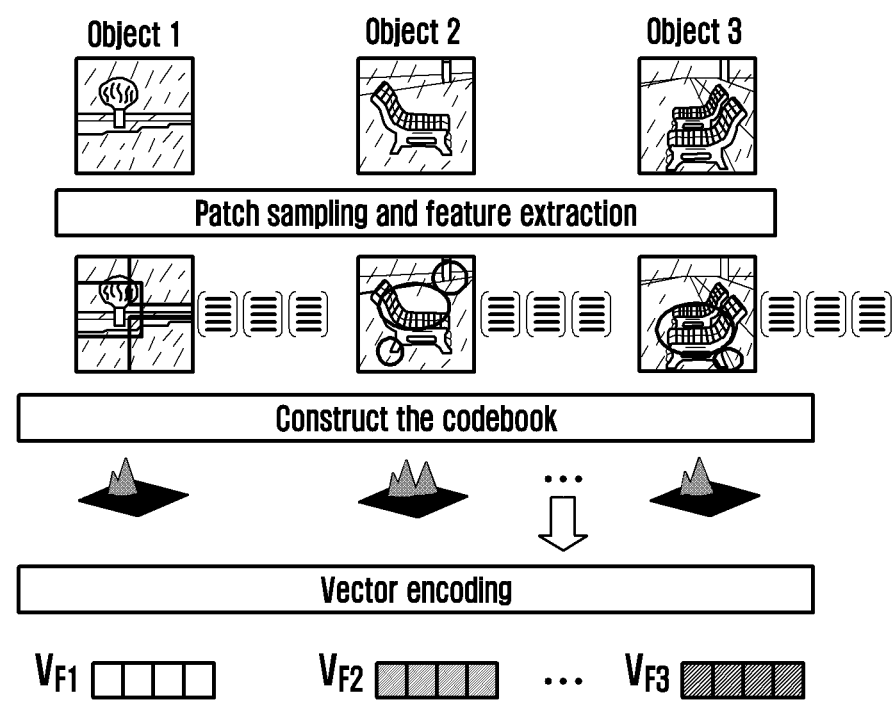
FIG. 5B illustrates a visual object clustering engine of an image processing engine, according to an embodiment.

FIG. 5B illustrates a visual object clustering engine of an image processing engine, according to an embodiment.

Referring to FIG. 5B, once the spatial relationship between the plurality of objects in the image is determined, the visual object clustering engine generates clusters using highly co-related objects in the image.

For example, consider three objects, i.e., object 1, object 2, and object 3, which are passed through a multi-layered system to determine the co-occurrence relation between the objects. The concurrence relation between the objects may be represented as shown in Table 4, where $v_{F1}$, $v_{F2}$ and $v_{F3}$ are relationship vectors of object 1, object 2, and object 3, respectively. The concurrence relation between the objects may be used to generate a correlation matrix, e.g., as shown in Table 4 below.

TABLE 4

|  | $v_{F1}$ | $v_{F2}$ | $v_{F3}$ |
|---|---|---|---|
| $v_{F1}$ | 1 | 0.92 | 0.88 |
| $v_{F2}$ | 0.92 | 1 | 0.07 |
| $v_{F3}$ | 0.88 | 0.07 | 1 |

The higher the values with respect to any two objects in the confusion matrix, the inference is that the two objects belong to the same cluster. Therefore, based on the correlation matrix, a first cluster includes the $v_{F1}$ and the $v_{F2}$, i.e., object 1 and object 2 belong to the first cluster. A second cluster includes the and the $v_{F3}$, i.e., object 1 and object 3, belong to the first cluster.

FIG. 6A illustrates data used for training an image to text descriptor engine 246 and an (image+text) descriptor engine, according to an embodiment.

Referring to FIG. 6A, the table indicates data that is used to train the image to text descriptor engine and the (image+text) descriptor engine.

The data is formatted in <Image: Description Texts: External Factors> format. A plurality of images along with the description provided by the various users with the external factors are fed to the image to text descriptor engine for training to be able to modify the input image automatically based on the learning.

For example, using an image showing a sunset view with boat and water in the scene, as illustrated in FIG. 6A, the various descriptions for the image provided by the user can include 'What a beautiful sunset!'. 'Water, fishes, boat & beautiful background!! I wish I could be there ☺ ', 'Serene & beautiful. Would love to go there', 'Mesmerizing scene. Perfect sunset to view', etc. The external factors for the image include time details such as 07:06 PM, location details such as Busan Beach, application context details such as Instagram®, Facebook®, and temperature details such as 26° C.

Therefore, in learning phase features are extracted from all of the images. Similar features are clustered together to generate a visual word vocabulary that represents unique features of the plurality of images used in the learning phase. Therefore, during an inference phase when a new image is input to the electronic device, the electronic device generates an object feature mapping table for an image based on the learning and automatically modifies the parts of the image which has similar objects in the image.

Figure 6B:
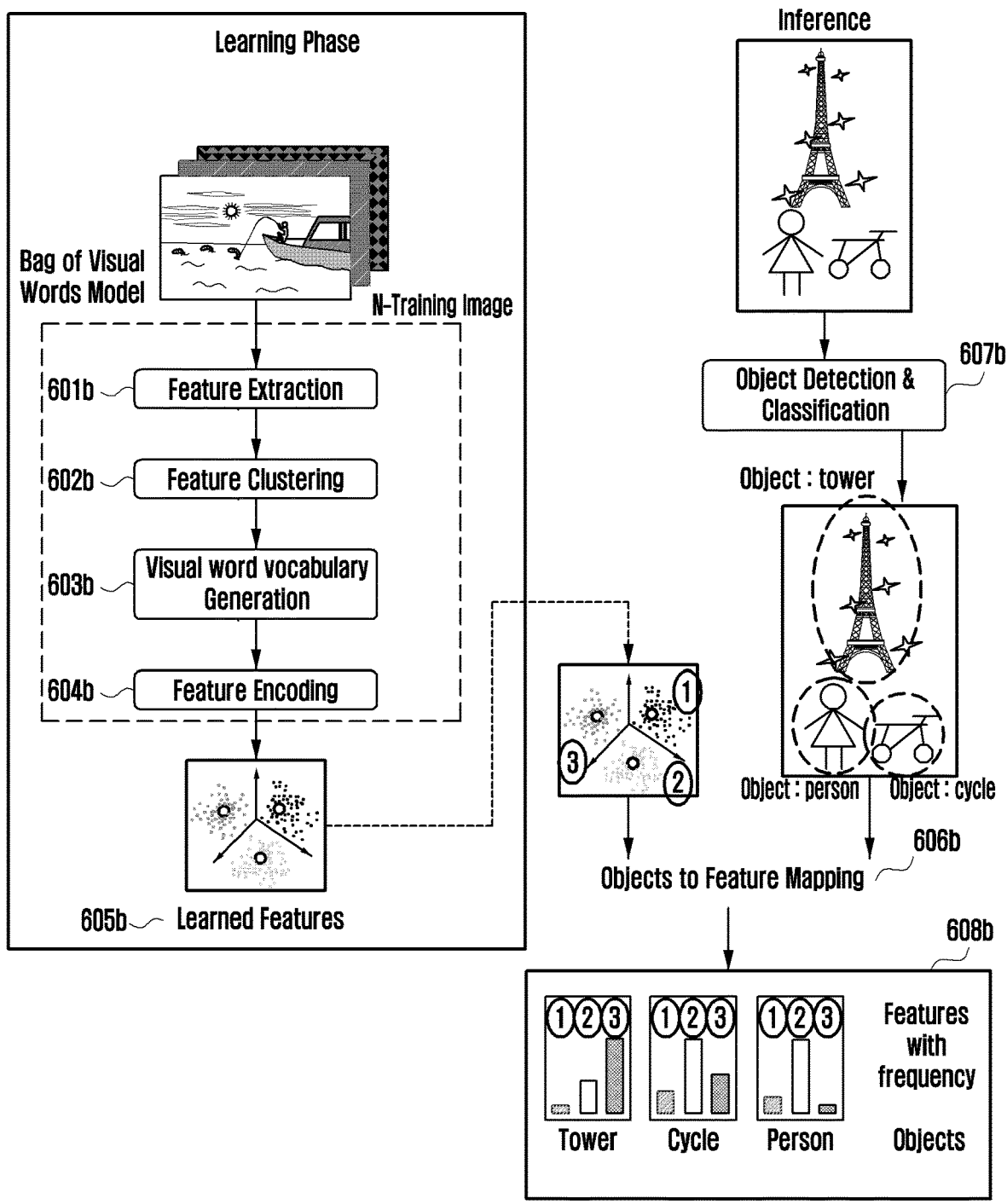
FIG. 6B illustrates an overview of a functioning of an image to text descriptor engine of an electronic device, according to an embodiment.

FIG. 6B illustrates functions of an image to text descriptor engine of an electronic device, according to an embodiment.

Referring to FIG. 6B, in the learning phase a Bag of Visual Words Model is used for learning. The Bag of Visual Words Model includes various steps such as feature extraction, feature clustering, visual word vocabulary generation, and feature encoding, which will be described in more detail below with reference to FIGS. 6C-6F.

At step 601b, feature extraction is performed to extract features from the plurality of images used for training the image to text descriptor engine of the electronic device.

At step 602b, at least two similar features in the image are clustered together in the feature clustering phase. The feature clustering phase may generate a plurality of clusters, each having a specific feature.

At step 603*b*, the visual word vocabulary generation phase determines a synonym for each of the clusters of the plurality of clusters.

At step 604*b*, the features are encoded for the electronic device to read the same.

At step 605*b*, the learned features (e.g., feature 1, feature 2, and feature 3) are provided to the object to feature mapping phase.

At step 606*b*, in the inference phase, the electronic device performs the object detection and detects objects such as a dog, a car, and a cycle in the image provided in the input mage. The output from the object detection is provided to the object to feature mapping phase, at step 606*b*, which is mapped as shown in step 608*b*.

Therefore, in FIG. 6B, feature 1 has a greater frequency of occurrence in the cycle object than in the dog object and the car object. Similarly, feature 2 has a greater frequency of occurrence in the cycle object and the car object than in the dog object.

Figure 6C:
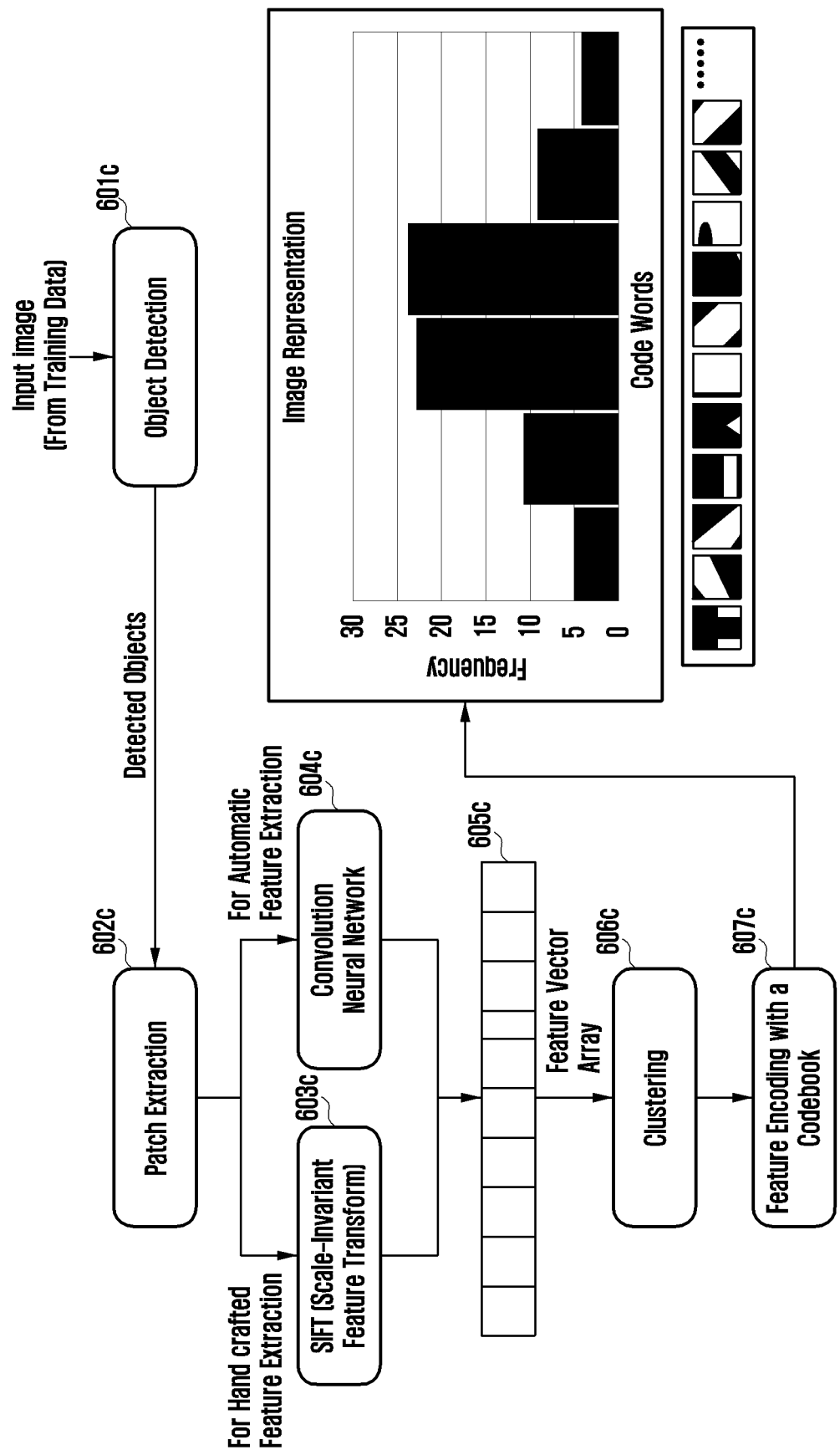
FIG. 6C illustrates a bag of visual words generation performed by an image to text descriptor engine, according to an embodiment.

FIG. 6C illustrates a bag of visual words generation performed by an image to text descriptor engine, according to an embodiment.

Referring to FIG. 6C, at step 601*c*, the input image is received by the image to text descriptor engine from among the training data and the object in the input image is detected by the electronic device.

At step 602*c*, the patch extraction is performed by the image to text descriptor engine to extract patches form the object detected in the input image.

At step 603*c*, the hand crafted features are extracted, where the features to be extracted are pre-defined and fed to the electronic device.

At step 604*c*, the CNN automatically extracts the features from the object in the input image.

At step 605*c*, a feature vector array is generated, and at step 606*s*, an existing clustering mechanism is performed to cluster similar features in the input image.

At step 607*c*, the input image is encoded by the electronic device.

The features are represented as code words along with the frequency of the occurrence of the feature in the image, as illustrated in FIG. 6C.

Figure 6D:
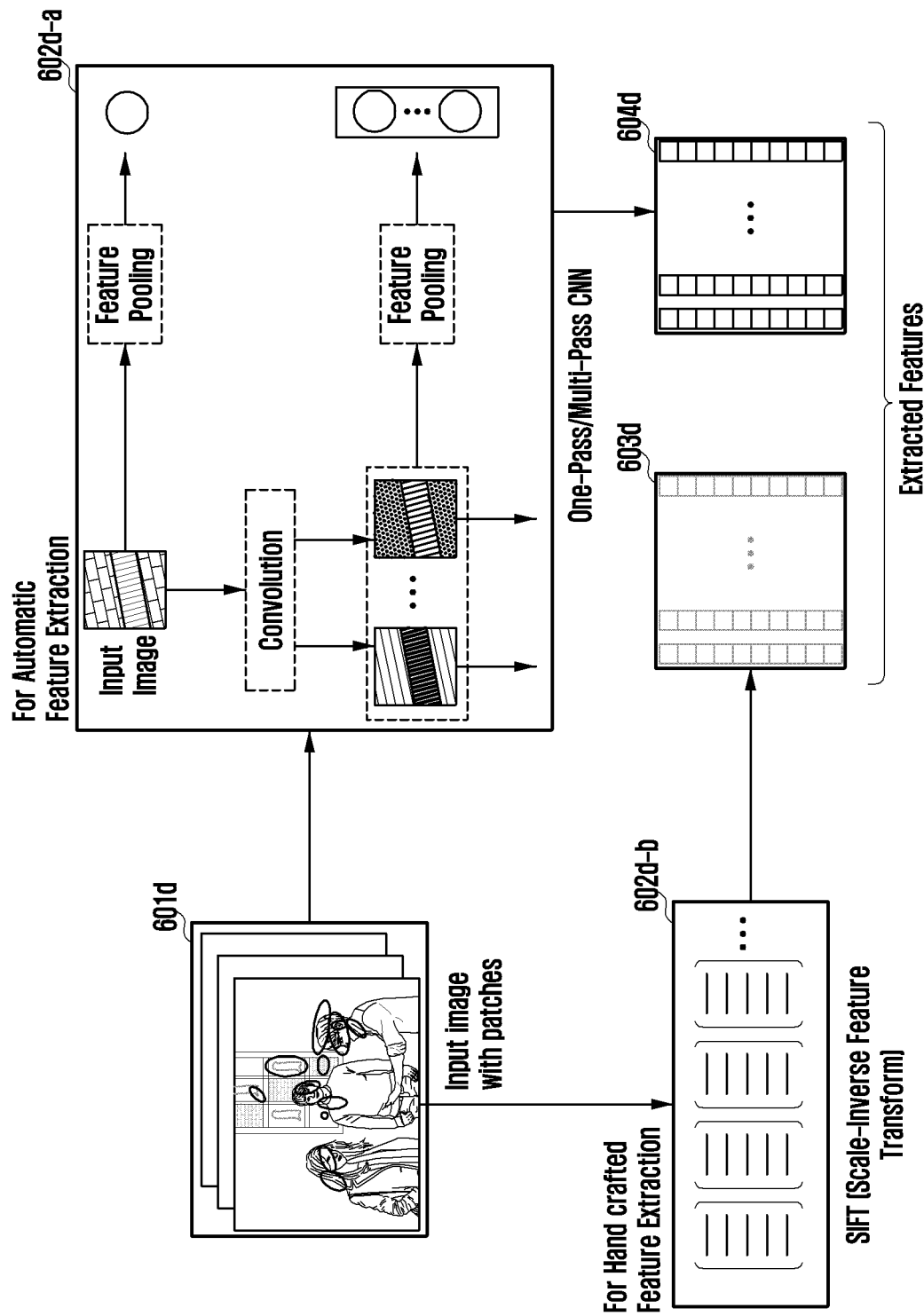
FIG. 6D illustrates a feature extraction technique performed by an image to text descriptor engine of an electronic device, according to an embodiment.

FIG. 6D illustrates feature extraction techniques performed by an image to text descriptor engine of the electronic device, according to an embodiment.

Referring to FIG. 6D, at step 601*d*, the input image is received from among the plurality of images used for training which includes plurality of patches.

At step 602*da*, the automatic extraction of features is performed on the input image by one-pass/multi-pass CNN.

At step 604*d*, the features are extracted from the input image.

At step 602*db*, the hand crafted features are extracted where the features to be extracted are pre-defined and fed to the electronic device using a scale-inverse feature transform (SIFT) technique.

At step 603, the features are extracted from the input image.

Figure 6E:
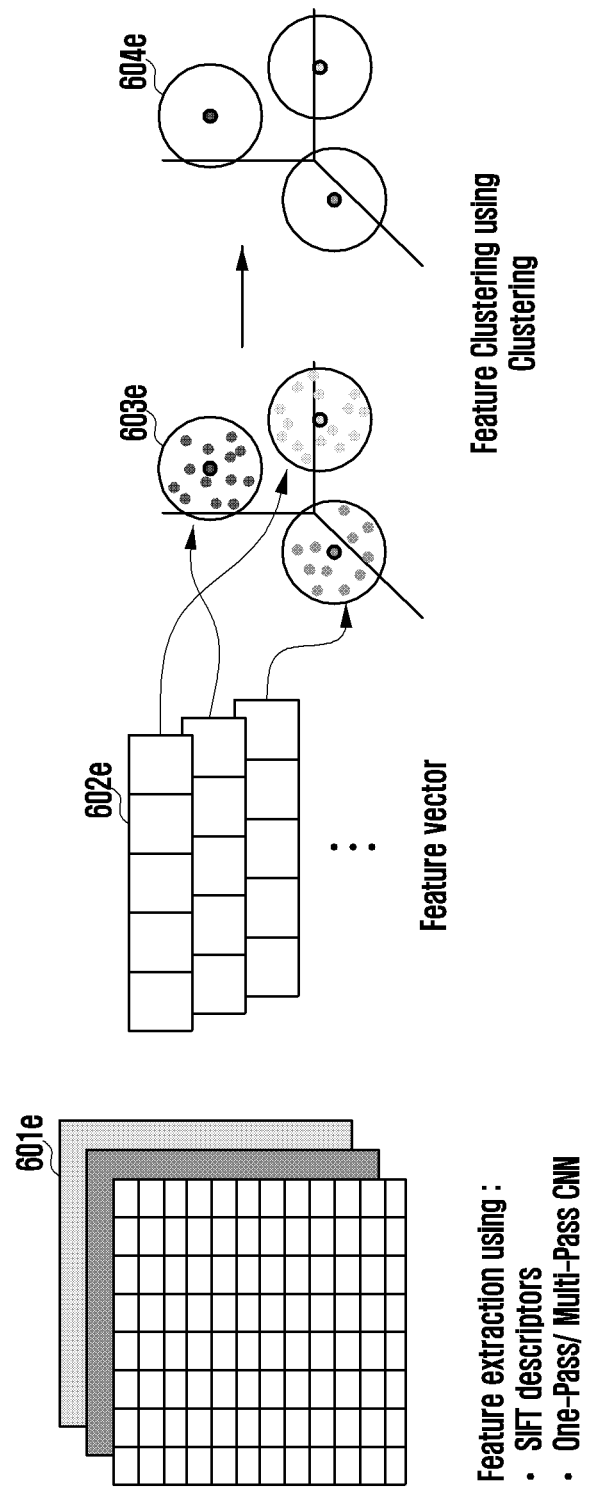
FIG. 6E illustrates a feature clustering technique performed by an image to text descriptor engine of an electronic device, according to an embodiment.

FIG. 6E illustrates a feature clustering technique performed by an image to text descriptor engine of an electronic device, according to an embodiment.

Referring to FIG. 6E in conjunction with FIG. 6D, at step 601*e*, features extracted using the techniques as described in FIG. 6D are obtained.

At step 602*e*, the feature vector is generated, and at steps 603*e* and 604*e*, the features are clustered based on similarity/co-relation between the plurality of features extracted from the images. The feature clustering is performed using the clustering mechanism.

Figure 6F:
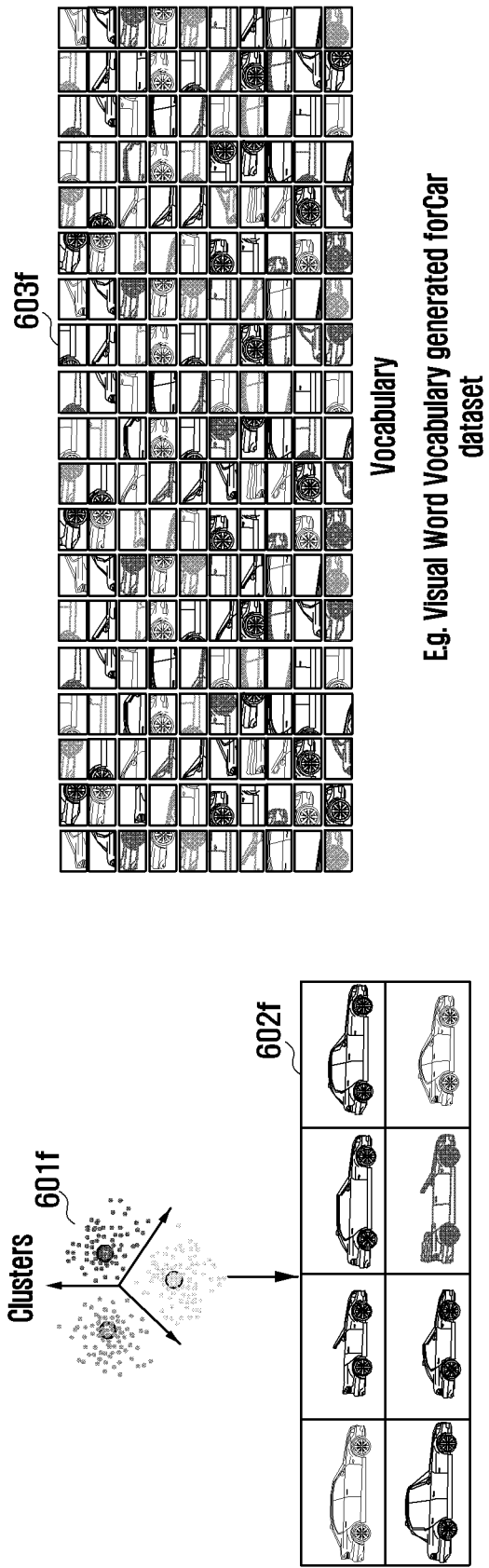
FIG. 6F illustrates a conventional mechanism used for visual word vocabulary generation performed by an image to text descriptor engine of an electronic device.

FIG. 6F illustrates a conventional mechanism for visual word vocabulary generation performed by an image to text descriptor engine of an electronic device.

Referring to FIG. 6F, at step 601*f*, obtained clusters are used for visual word vocabulary generation by the image to text descriptor engine. The centroid of each cluster represents the visual word in the vocabulary. Therefore, K clusters implies K words in the visual vocabulary.

At step 602*f*, the various images of the object car are provided, and in step 603*f*, the various patches associated with the car object are seen, which represent the visual vocabulary for the car object, such as steering wheel, windscreen, car tire, car bonnet, car shield, etc. Therefore, any car image can be represented using the visual vocabulary features depicted in step 603*f*.

Figure 6G:
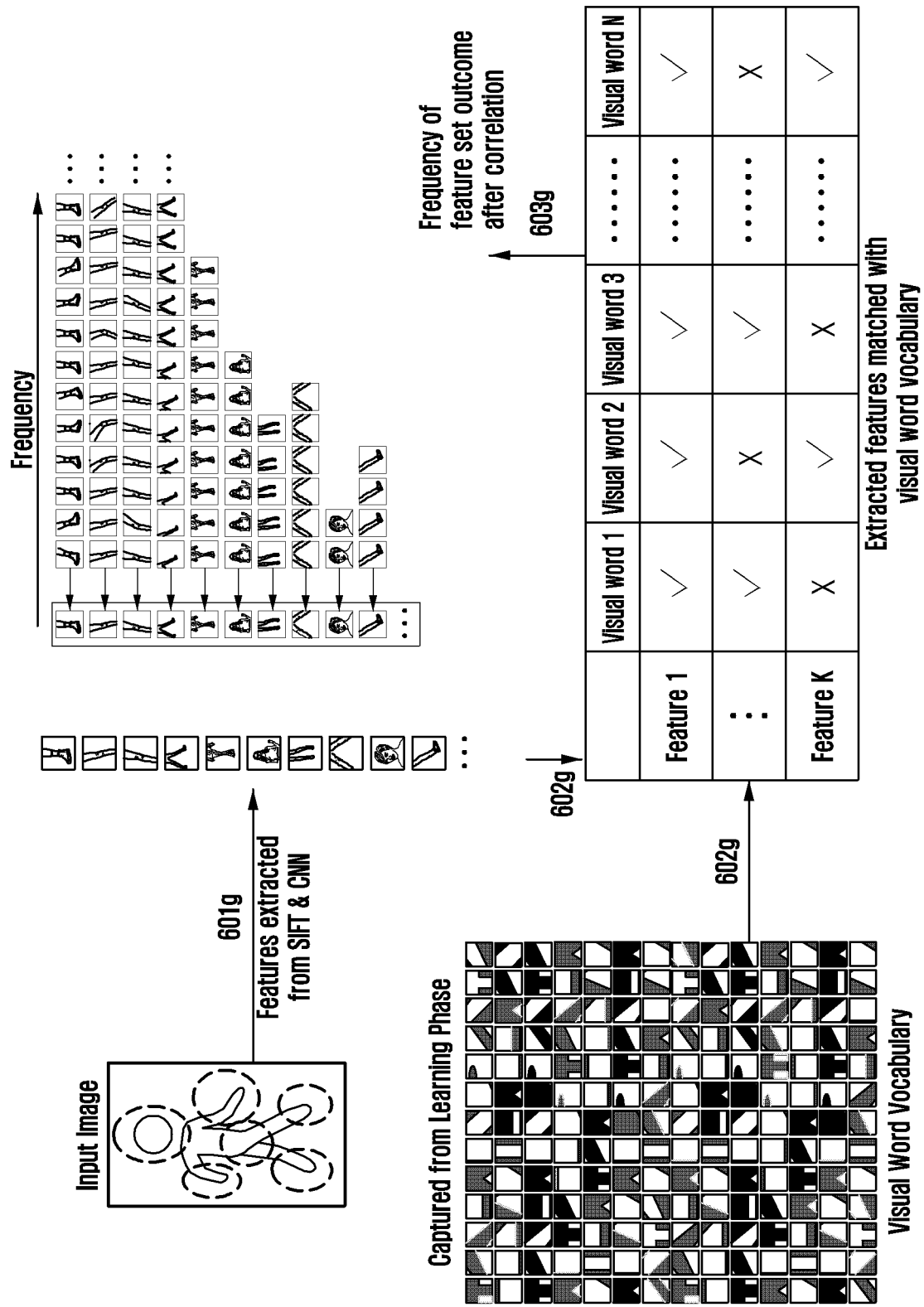
FIGS. 6G and 6H illustrate a method for object to feature mapping performed for at least one image by an image to text descriptor engine of an electronic device, according to an embodiment.
Figure 6H:
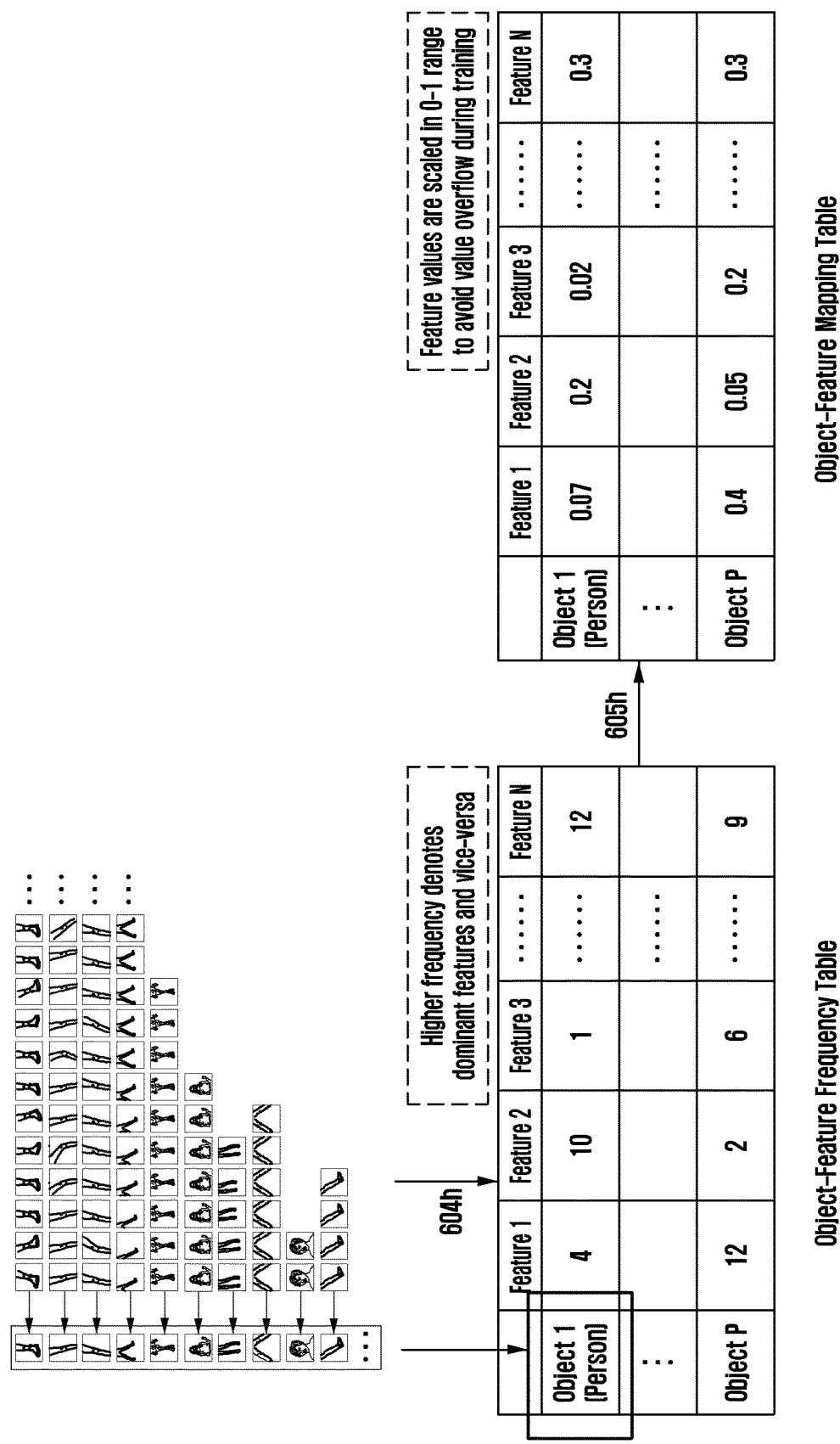

FIGS. 6G and 6H illustrate object to feature mapping performed for an input image by an image to text descriptor engine of an electronic device, according to an embodiment.

Referring to FIGS. 6G and 6H, at step 601*g*, an input image including a human is received by the image to text descriptor engine and the features of the human are extracted using the SIFT and the CNN techniques, such as the face of the human, arms, legs, foot, back-representation, head, etc.

At step 602*g*, the features extracted from the input image are matched with the visual word vocabulary that was created during the learning phase to generate a table containing the features which are present in the image, as described in FIG. 6F.

At step 603*g*, the frequency of the feature set outcome after correlation is generated, indicating that the features occur frequently and not so frequently.

At step 604*h*, an object-feature frequency table is generated which maps the objects and the features associated with the particular object along with the frequency of occurrence of the particular feature in the particular object. For example, feature 1 occurs only 4 times with respect to object 1, whereas feature 1 occurs 12 times with respect to object P. Therefore, the higher frequency of occurrence of the feature with respect to the object denotes dominant features and vice-versa.

At step 605*h*, an object-feature mapping table is generated which contains the score for the visual features associated with the objects in the image. Further, feature values are scaled in 0-1 range to avoid value overflow during training phase by normalization.

Figure 7A:
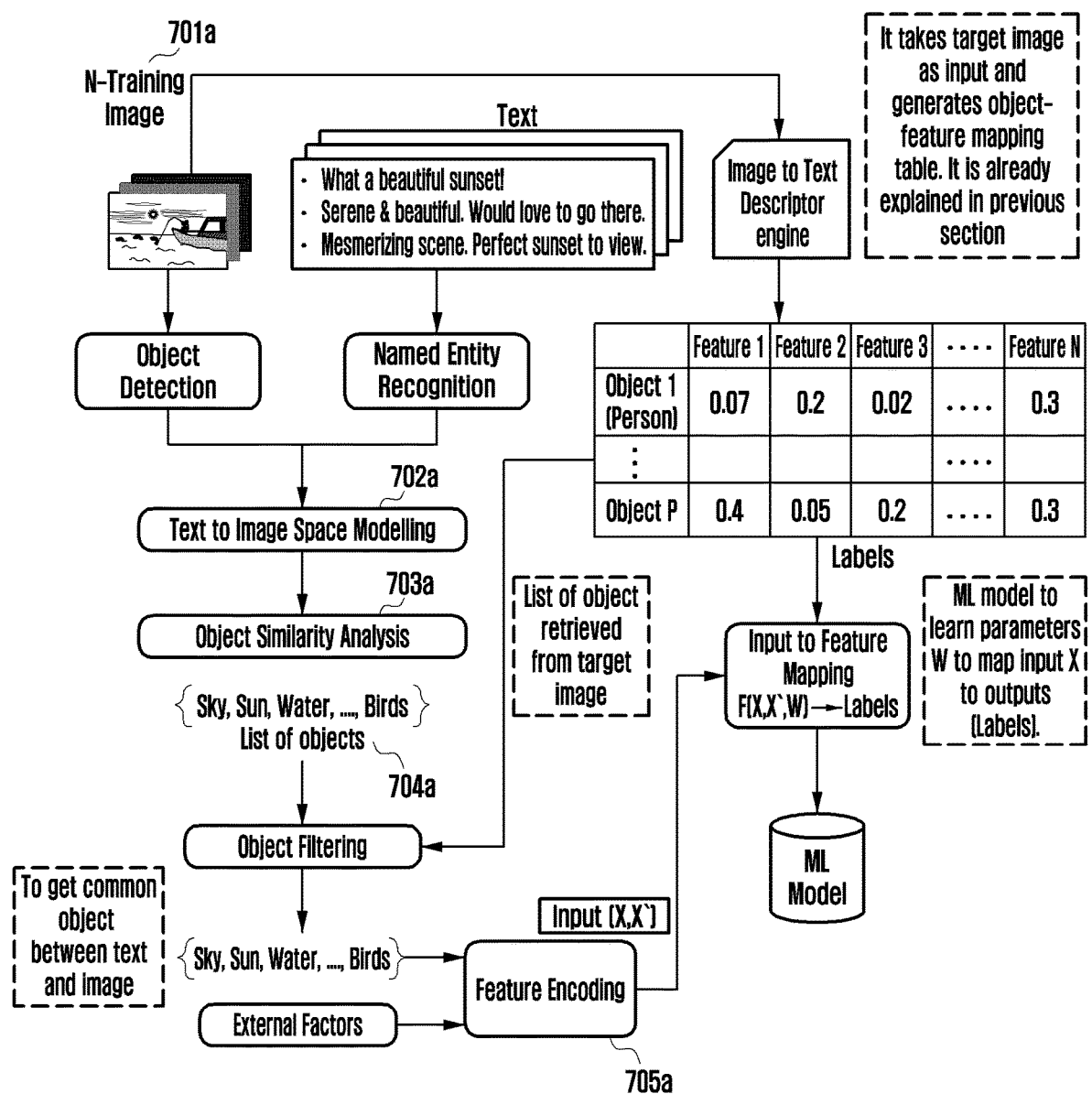
FIG. 7A illustrates an overview of a functioning of an (image+text) to text descriptor engine of an electronic device, according to an embodiment.

FIG. 7A illustrates a function of an (image+text) to text descriptor engine of an electronic device, according to an embodiment.

Referring to FIG. 7A, the training phase of the (image+text) to text descriptor engine is shown. The NLP provided in the (image+text) to text descriptor engine is used to determine the intent of the user based on the textual description provided by the user and to map the text to the various objects identified in the plurality of images. Further, the plurality of images, the textual description associated with the plurality of images and the external factors are used to generate a learned parameter matrix Wand the object to feature mapping table.

At step 701*a*, the plurality of images are provided to the object detection system of the (image+text) to text descriptor engine to determine the objects in the plurality of images and the textual description associated with the plurality of images is provided to the named entity recognition (NER)

system to determine the various entities named in the textual description associated with the plurality of images.

At step 702a, the output from the object detection system and the NER system are provided to the text to image space modeling system (as will described more in FIG. 7C), where the entities extracted from the text and the objects extracted from the images are mapped to each other with the similar objects located close to each other.

At step 703a, the object similarity analysis is performed to determine the similarity between the objects and the entities. The semantic and spatially similar objects corresponding to a given object may be determined based on a Euclidean distance in the object vector space. The objects within a range of Euclidean distance of the concerned object are added to a similarity table, e.g., as shown in Table 5 below.

TABLE 5

| Object | Similar Objects |
|---|---|
| Bird | [Wings, Feather, Sky, . . . , Air] |
| Garden | [Meadow, Flower, Tree, . . . , Green] |
| Cloud | [Rain, Sky, Grey, . . . , Dark] |
| . . . | . . . |

At step 704a, a common list of objects is obtained between the text and the image by filtering the similar objects obtained at step 703a using the list of objects retrieved from the input image.

At step 705a, a feature encoding is generated using the filtered objects (X) and the external factors (X'), which are then fed as inputs to the input-to-feature mapping system. The input-to-feature mapping system may be an ML system that learns parameter W to map inputs (X, X) to output (Labels). The ML model can be represented mathematically as the following function:

$$F(X, X', W) \rightarrow Labels.$$

Figure 7B:
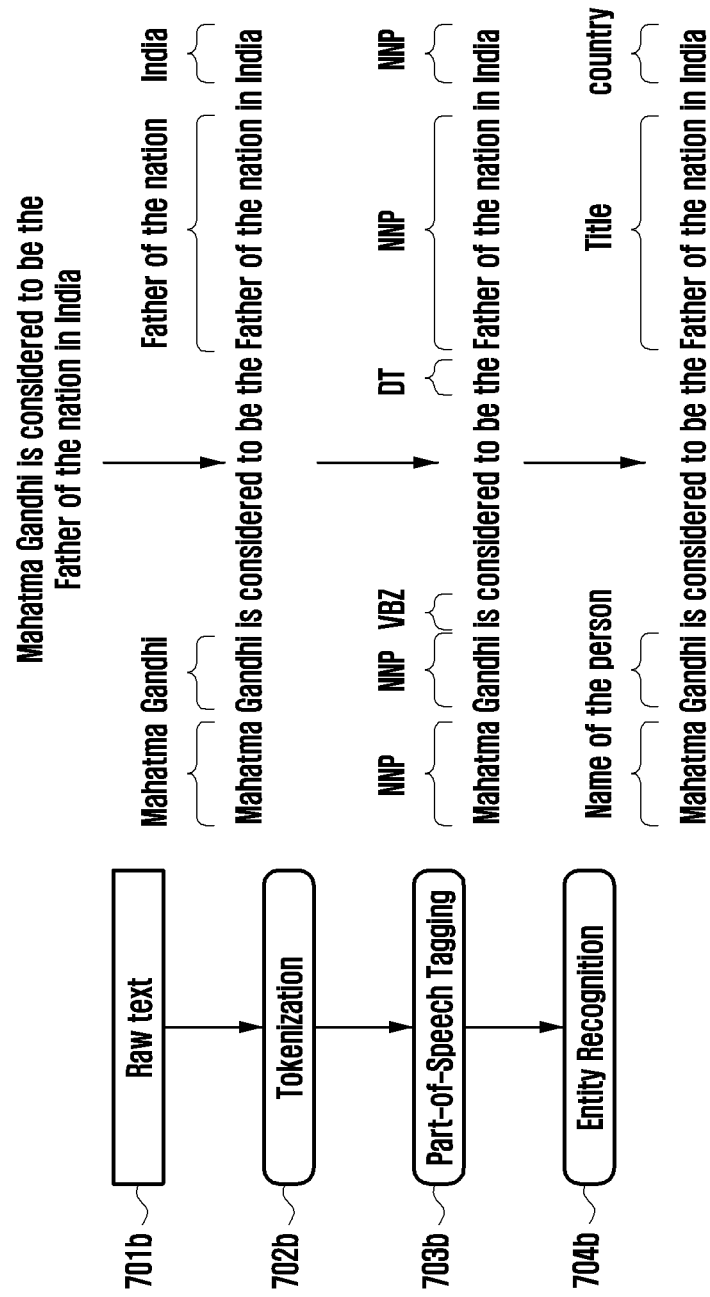
FIG. 7B illustrates a functioning of a named entity recognition (NER) system of an (image+text) to text descriptor engine of an electronic device, according to an embodiment.

FIG. 7B illustrates a functioning of an NER system of an (image+text) to text descriptor engine of an electronic device, according to an embodiment.

Referring to FIG. 7B, the NER system, at step 701b, receives the raw text, e.g., Mahatma Gandhi is considered to be the Father of the nation in India.

At step 702b, the NER system generates the tokens from the raw text.

At step 703b, the NER system performs the part-of-speech tagging and creates tags for the tokens generated.

At step 704b, the NER system recognizes the entities from the tags, such as the named entity labels person, title, country, etc.

Therefore, as illustrated in FIG. 7B, the person is Mahatma Gandhi, the title is Father of the nation, and the country is India, which is recognized by the NER system of the (image+text) to text descriptor engine.

Figure 7C:
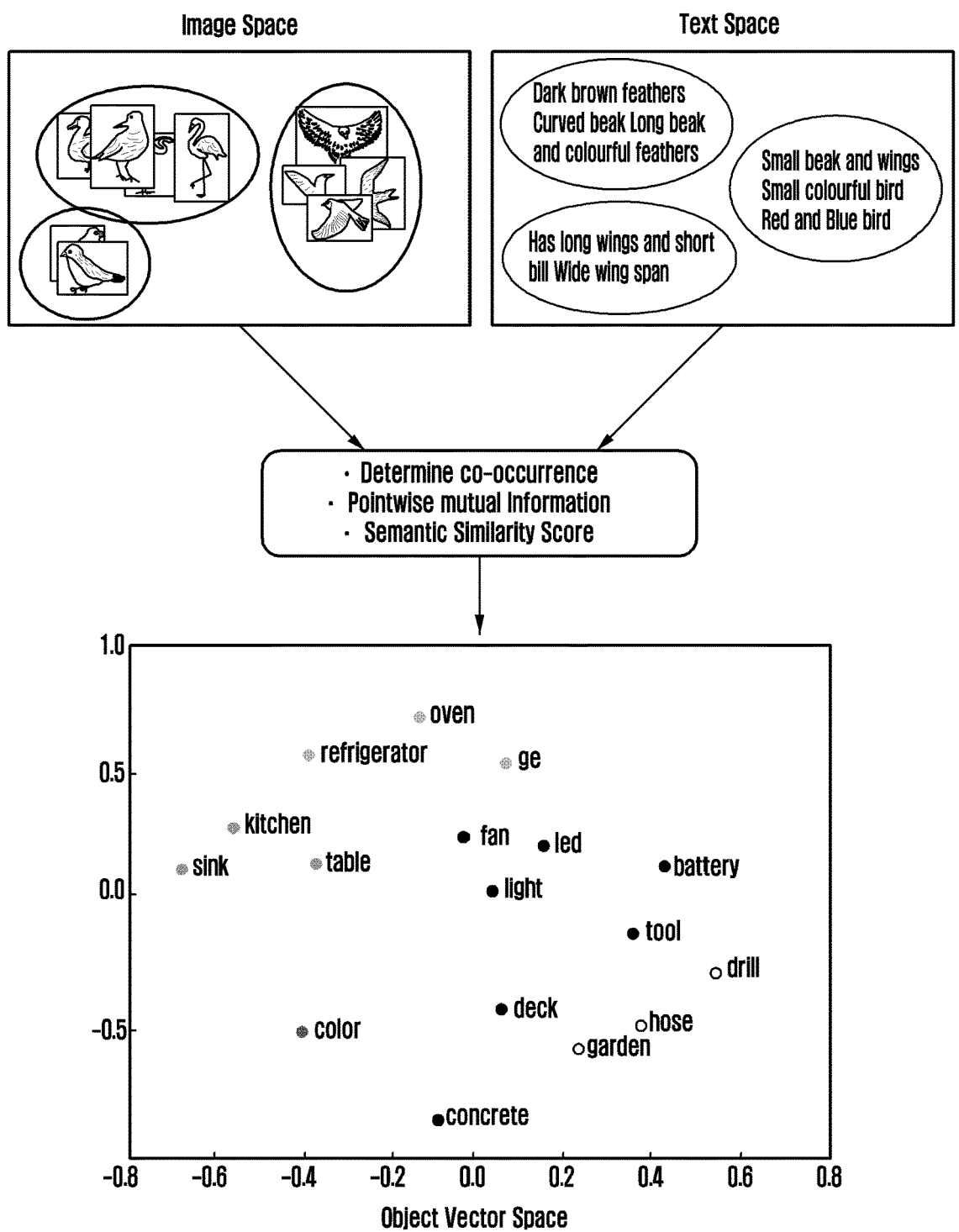
FIG. 7C illustrates a functioning of a text to image space modelling system of an (image+text) to text descriptor engine of an electronic device, according to an embodiment.

FIG. 7C illustrates a function of a text to image space modelling system of an (image+text) to text descriptor engine of an electronic device, according to an embodiment.

Referring to FIG. 7C, the plurality of images and the textual description associated with the plurality of images are taken and a co-occurrence is determined between the two. The point wise mutual information is recognized, and a semantic similarity score is calculated. The pointwise mutual information (PMI) of a pair of outcomes x and y belonging to the discrete random variables X and V quantifies the discrepancy between the probability of the coincidence given the joint distribution and the individual distributions, assuming independence. The objects extracted from the image and the entities extracted from the text are combined and represented in the object vector space where similar objects are located close to each other.

Figure 7D:
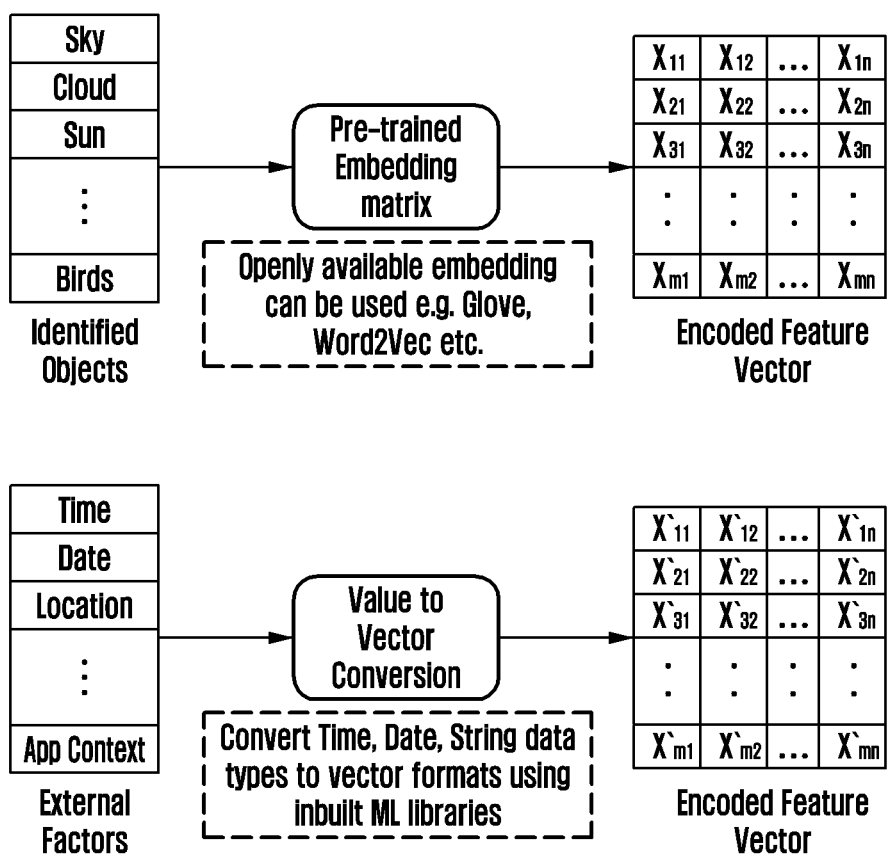
FIG. 7D illustrates a feature encoding performed by an (image+text) to text descriptor engine of an electronic device, according to an embodiment.

FIG. 7D illustrates feature encoding performed by an (image+text) to text descriptor engine of an electronic device, according to an embodiment.

Referring to FIG. 7D, the identified objects in the input image are converted into encoded feature vector using pre-trained embedding matrix. To obtain the encoded feature vector, openly available embedding can be used, for example, Glove, Word2Vec, etc.

Also, the external factors are converted into the encoded feature vector by a value to vector conversion techniques, such as inbuilt ML libraries which convert time, date, and string data types to vector formats.

Figure 7E:
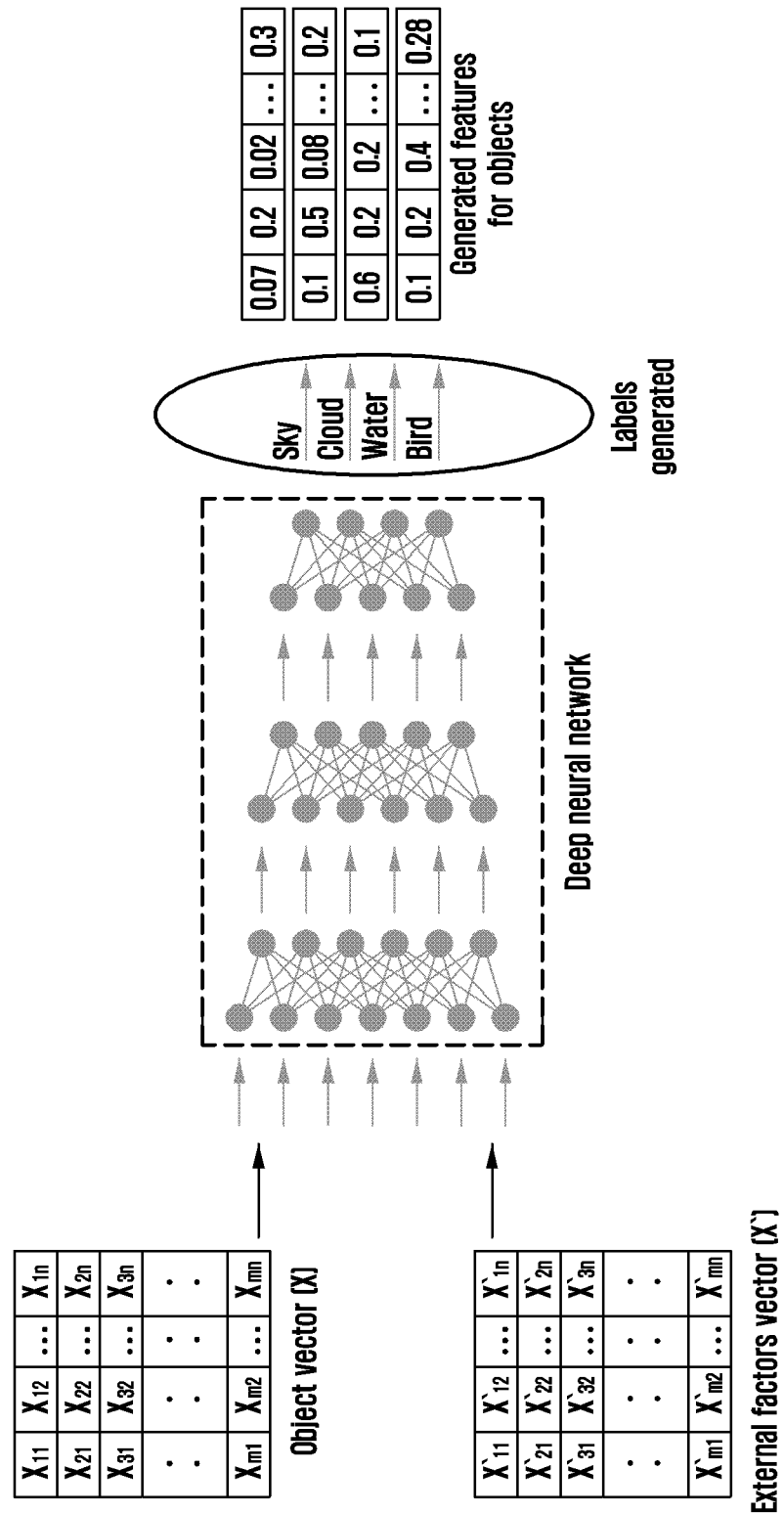
FIG. 7E illustrates an input to feature mapping by an (image+text) to text descriptor engine of an electronic device, according to an embodiment.

FIG. 7E illustrates input to feature mapping by an (image+text) to text descriptor engine of an electronic device, according to an embodiment.

Referring to FIG. 7E, in conjunction with FIG. 7A, where at step 705a, the object vector (X) and the external factors vector (X') are processed using a deep neural network to obtain the learned parameter matrix W, the learned parameters in the learned parameter matrix W are learned during the learning/training phase. The output of the deep neural network includes the labels, which are then used to the generate features for the objects in the input image, i.e., generating the visual feature scores given the textual description associated with the input image, the input image and the external factors.

FIG. 8 illustrates an example of the inference of the functioning of the (image+text) to text descriptor engine (148) of the electronic device (100) in real-time, according to an embodiment as disclosed herein.

Referring to FIG. 8, at step 801, the input image is received by the object detection engine and the object in the input image is detected.

At step 802, the textual description provided by the user to the input image, such as "Enjoying in a beautiful sunny evening!!!", is provided to the NER system to identify the entities in the textual description. Based on the object detected from the input image and the entities identified from the textual description, the list of objects X is determined.

At step 803, the external factors X' are determined by the electronic device.

At step 804, both the list of objects X and the external factors X' are provided to the input to feature mapping engine along with the learned parameters matrix W to generate the labels (step 805) which are then used to generate the object to feature mapping table.

Figure 9:
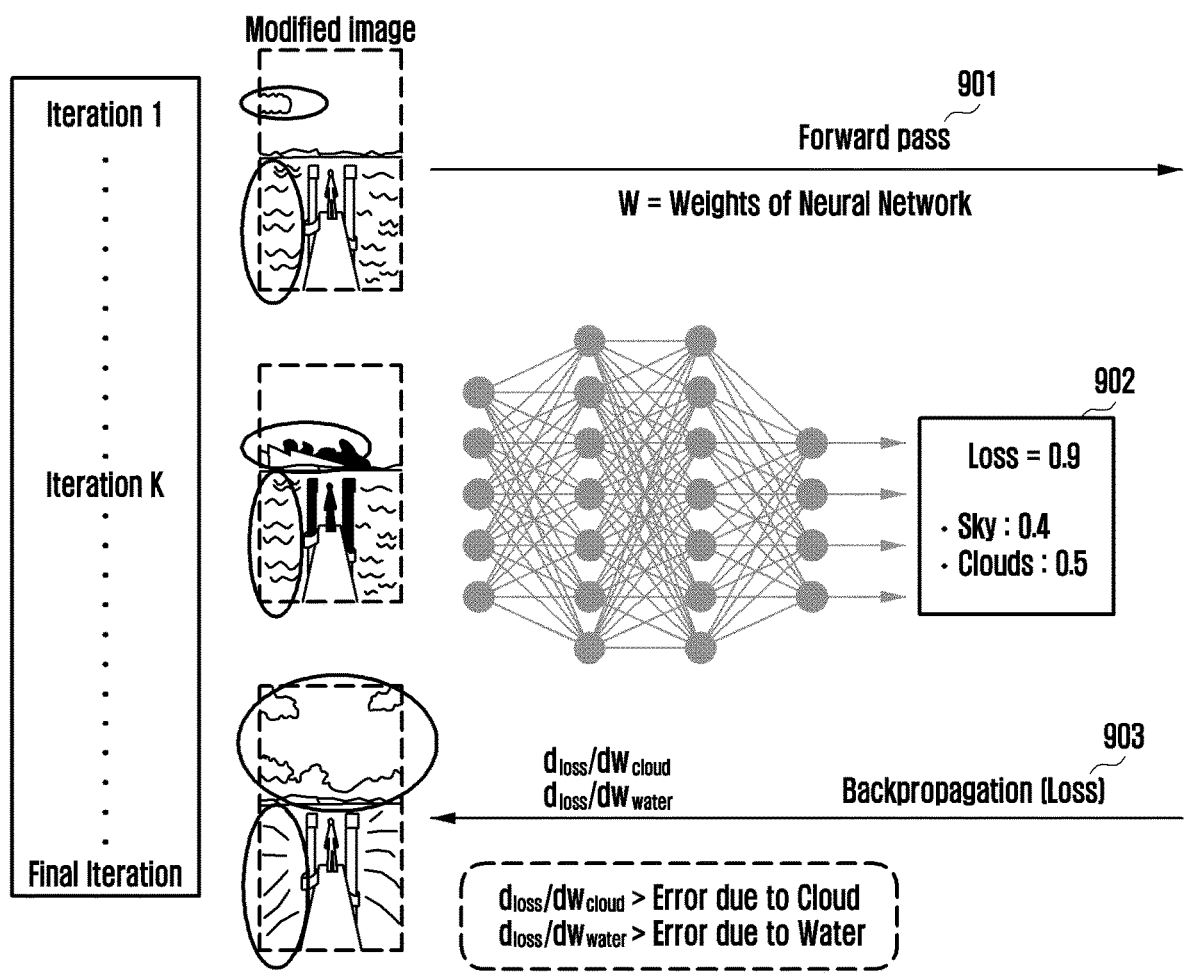
FIG. 9 illustrates an example of automatic modification of an image based on back-propagation of a loss factor, according to an embodiment.

FIG. 9 illustrates automatic modification of an image based on back-propagation of a loss factor, according to an embodiment.

Referring to FIG. 9, at step 901, the electronic device receives the input image along with the textual description associated with the input image and the external factors.

At step 902, the electronic device modifies the input image and generates the loss factor $d_{loss}/dw_{cloud} + d_{loss}/dw_{water}$ for the modified image, which is forward propagated in the first iteration.

At step 903, the electronic device determines whether the determined loss factor is within the loss threshold. In response to determining that the loss factor is within the loss threshold, the electronic device accepts the modified image as the final image post modification.

In response to determining that the loss factor is not within the loss threshold, the electronic device back propagates the loss in order to re-modify the modified image. The loss factor is back propagated, and the image is re-modified until the loss factor is within the loss threshold. Therefore, the electronic device may perform a plurality of iterations to modify the image until the loss factor is within the loss threshold.

Figure 10:
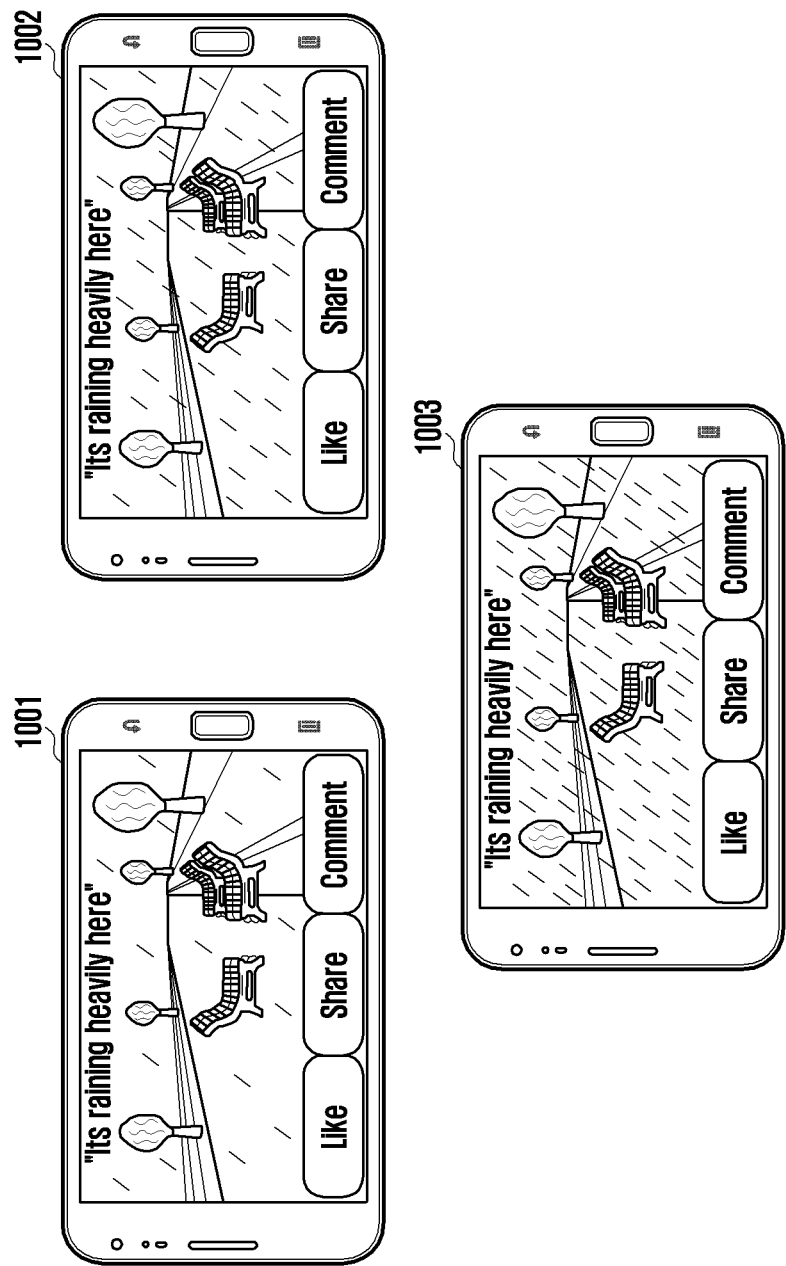
FIG. 10 illustrates a modification of an image based on a text description provided by a user in an electronic device, according to an embodiment.

FIG. 10 illustrates a modification of an image based on a text description provided by a user in an electronic device, according to an embodiment.

Referring to FIG. 10, at step 1001, the user selects the image to be shared in real-time on a social media platform, which depicts a scene of heavy rain. Further, the user describes the image by adding textual description to the image as "It's raining heavily here". However, the image at step 1001 does not clearly capture the rain in the scene, rendering the textual description and the image mismatched.

At step 1002, the electronic device automatically modifies the portion of the image that displays the rain based on the textual description, the external factors, and the intent of the user to depict the rain scene. Further, the electronic device determines the first descriptor for the modified image; and the second descriptor using the input image, the textual description and the external factors. The electronic device computes the loss factor by differentiating the first descriptor and the second descriptor; and compares the same with the loss threshold.

When the loss factor is below the loss factor threshold, the electronic device accepts the modified image as the final image to be uploaded to the social media platform. However, when the loss factor is not below the loss factor threshold, then the electronic device performs multiple iterations of modifying the image based on the textual description (where the intent of the user to depict the rain scene is derived from the textual description), the external factors and the input image itself to arrive at the image which best displays the rain in the image, as shown in step 1003.

Therefore, unlike the conventional methods and systems which modify an entire image based on the filter selected by the user, a method according to an embodiment of the disclosure automatically determines a match between the textual description provided by the user and the input image. Further, the method may automatically modify the portions of the input image that are co-related to the textual description provided by the user. Therefore, the method ensures a match between the textual description and the input image before the input image is shared on the social media platforms.

Figure 11:
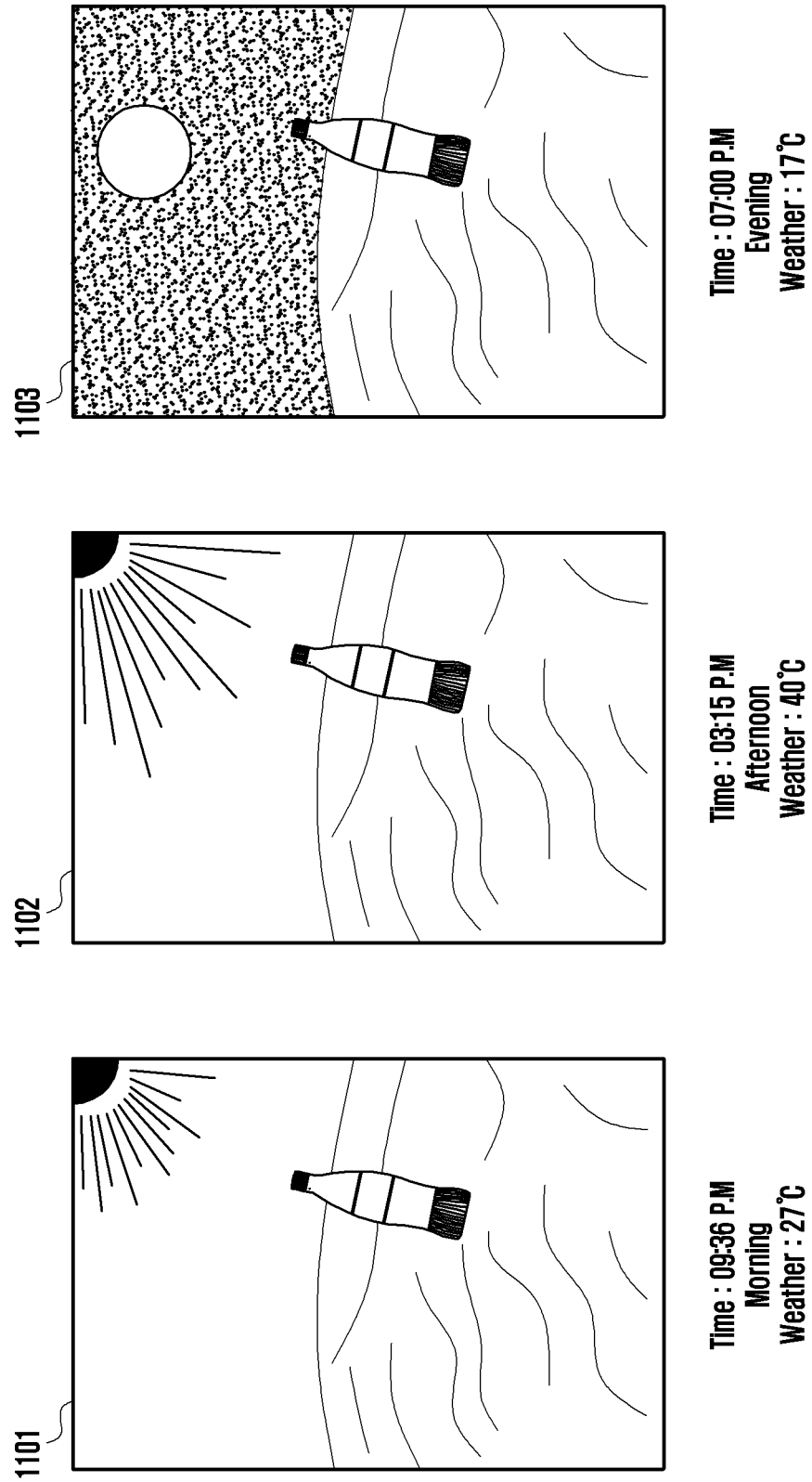
FIG. 11 illustrates a modification of an image based on external factors in an electronic device, according to an embodiment.

FIG. 11 illustrates a modification of an image based on external factors in an electronic device, according to an embodiment.

Referring to FIG. 11, a method according to an embodiment may be used for advertising products on billboards, which modify the image of the product according to the external factors, such as weather, location, time, etc. In FIG. 11, the billboard displays the advertisement of a bottled product.

At step 1101, the time is around 09.36 a.m and the atmospheric temperature is around 27° C., and the image of the bottled product is modified to depict the current time and weather.

At step 1102, when the time is 03:15 p.m and the atmospheric temperature is around 40° C. with the sun shining brightly, the image of the bottled product on the billboard is modified to reflect the same. The modified image displays the bright sunshine and the impact of the bright sunshine on the portions of the image, which are co-related, such as the sky, the sand, and also the reflection on the bottled product.

At step 1103, when the time is around 07:00 p.m., the atmospheric temperature is around 17° C., the sun has already set, and cold weather conditions are prevailing, the image of the bottled product on the billboard is modified to reflect the same. The modified image displays the dark night and the impact of the dark night on the portions of the image which are co-related.

Figure 12:
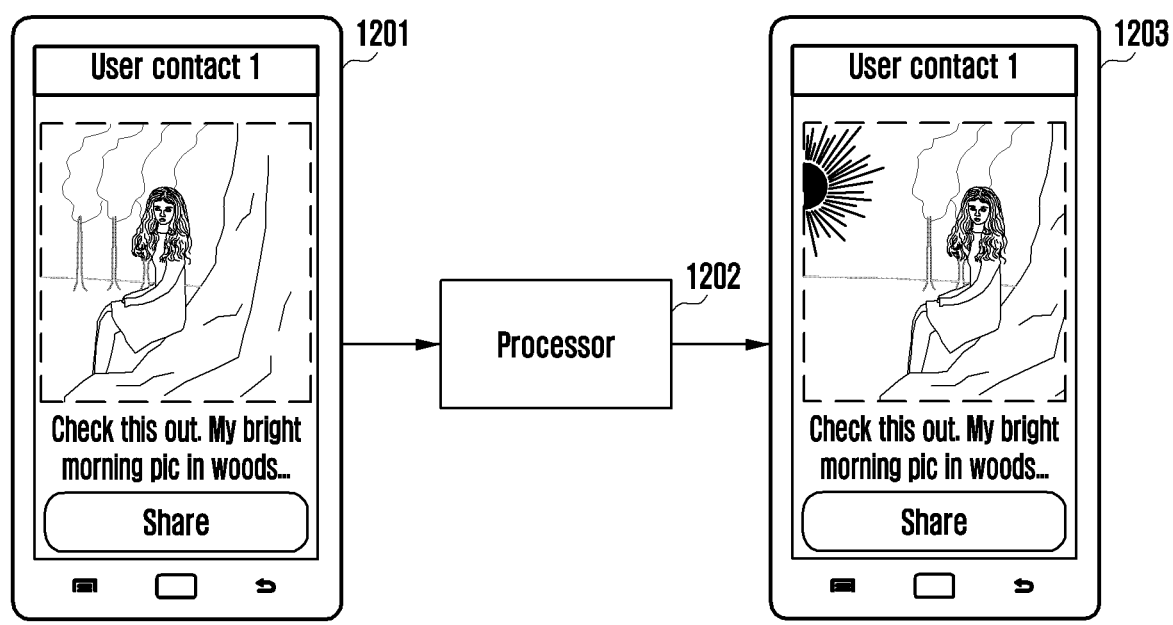
FIG. 12 illustrates a modification of an image during real time sharing of the image in an electronic device, according to an embodiment.

FIG. 12 illustrates a modification of an image during real time sharing of an image in an electronic device, according to an embodiment.

Referring to FIG. 12, a user shares an image using a messaging application in the electronic device.

At step 1201, the user selects the image to be shared and adds a caption describing the image as "Check this out. My bright morning pie in woods . . . ". However, the image at step 1201 does not clearly capture the brightness that the user has described about in the scene rendering the textual description and the image mismatched.

At step 1202, the electronic device automatically modifies the portion of the image that displays the brightness in the wood based on the textual description (where the intent of the user to depict the brightness in the scene is derived from the text description), the external factors. The electronic device determines the first descriptor for the modified image; and the second descriptor using the input image, the textual description and the external factors. The electronic device computes the loss factor by differentiating the first descriptor and the second descriptor; and compares the same with the loss threshold.

When the loss factor is below the loss factor threshold, the electronic device accepts the modified image as the final image to be shared using the messaging application. However, when the loss factor is not below the loss factor threshold, then the electronic device performs multiple iterations of modifying the image based on the textual description (where the intent of the user to depict the brightness in the scene to arrive at the image which best displays the brightness in the image) and the external factors, as shown in step 1203.

Therefore; the disclosed method ensures a match between the textual description and the input image before the input image is shared across applications such as the messaging application.

Figure 13:
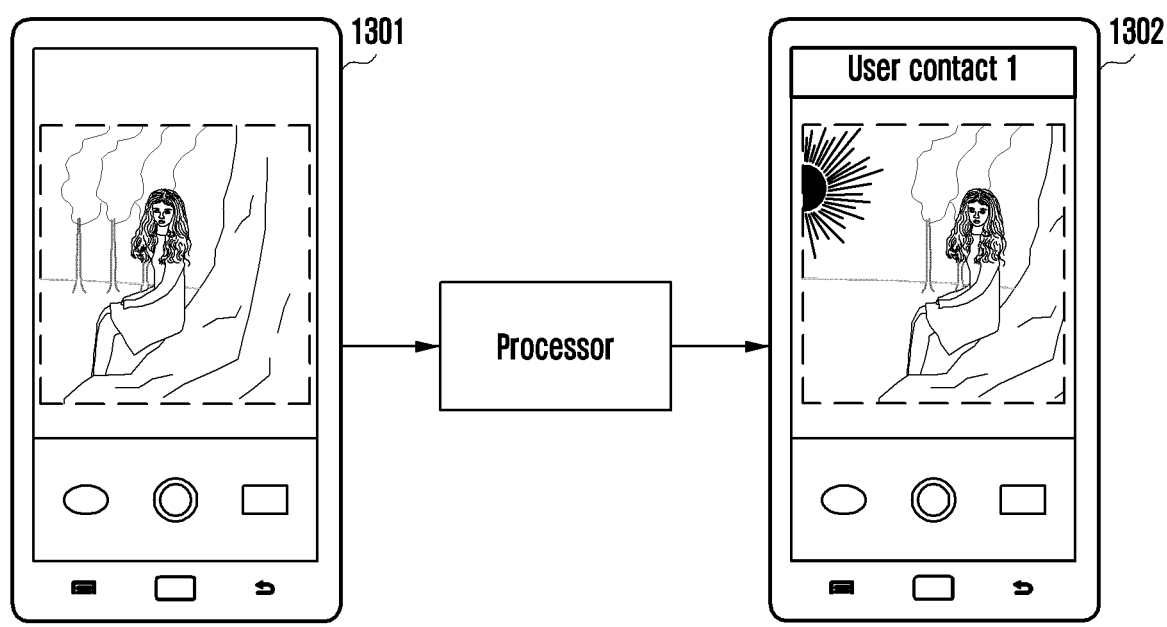
FIG. 13 illustrates a modification of an image in a live-preview mode of a camera application of an electronic device, according to an embodiment.

FIG. 13 illustrates a modification of an image in a live-preview mode of a camera application of an electronic device, according to an embodiment.

Referring to FIG. 13, at step 1301, the user accesses the camera application in the live-preview mode to capture a view which is within the field-of-view of the camera application.

At step 1302, the electronic device determines the external factors, such as bright sunshine, high temperature, etc., and automatically modifies the portion of the scene which displays the brightness the external factors to depict the brightness in the scene. The electronic device determines the first descriptor for the modified image; and the second descriptor using the input image, the textual description, and the external factors.

The electronic device computes the loss factor by differentiating the first descriptor and the second descriptor; and compares the same with the loss threshold.

When the loss factor is below the loss factor threshold, the electronic device accepts the modified scene as the final scene to be captured using the camera application. However, when the loss factor is not below the loss factor threshold, then the electronic device performs multiple iterations of modifying the portions of the scene based on the external factors to depict the brightness in the scene to capture at the scene which best displays the brightness in the scene, as shown in step 1303.

Figure 14:
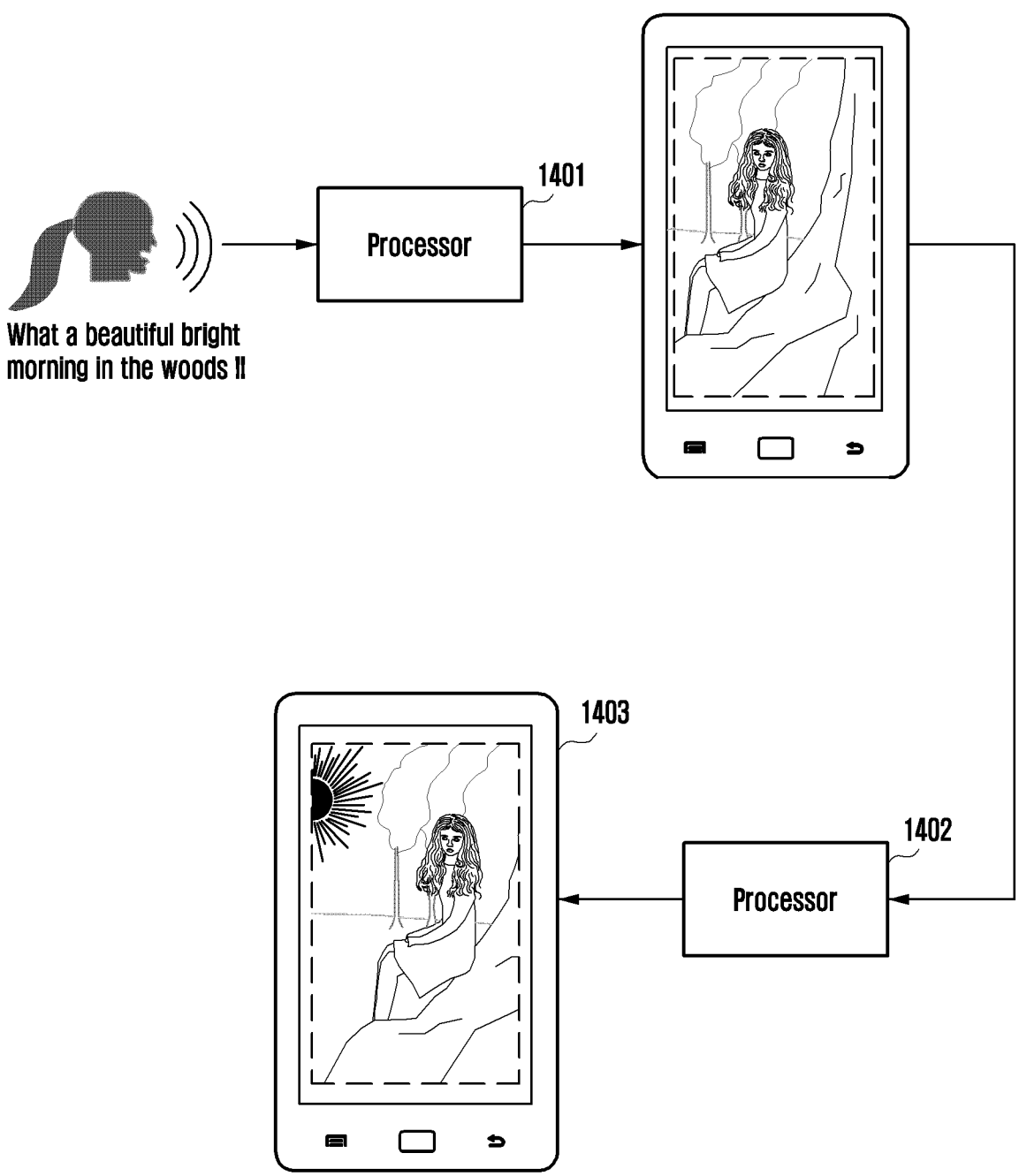
FIG. 14 illustrates a modification of an image based on a voice description provided by a user in a virtual assistant application of an electronic device, according to an embodiment.

FIG. 14 illustrates a modification of an image based on voice description provided by a user in a virtual assistant application of an electronic device, according to an embodiment.

Referring to FIG. 14 in conjunction with FIG. 11, a user shares an image using a messaging application in an electronic device.

At step 1401, the user selects the image to be shared and adds a caption using the virtual assistant application through voice input as "What a beautiful bright morning in the woods!! . . . ". However, the image at step 1401 does not clearly capture the brightness that the user has described about in the scene rendering the textual description and the image mismatched.

At step 1402, the electronic device automatically modifies the portion of the image which displays the brightness in the morning based on the voice input (where the intent of the user to depict the brightness in the scene is derived from the voice input) and the external factors. The electronic device determines the first descriptor for the modified image; and the second descriptor using the input image, the textual description, and the external factors. The electronic device computes the loss factor by differentiating the first descriptor and the second descriptor; and compares the same with the loss threshold.

When the loss factor is below the loss factor threshold, the electronic device accepts the modified image as the final image to be shared using the messaging application. However, when the loss factor is not below the loss factor threshold, then the electronic device performs multiple iterations of modifying the image based on the voice input, the external factors, and the intent of the user to depict the brightness in the scene to arrive at the image which best displays the brightness in the image, as shown in step 1403.

The foregoing description of the embodiments is provided to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method for description parameter based modification of images by an electronic device, the method comprising:
   receiving, from a user of the electronic device, a text input associated with an image displayed on the electronic device;
   determining, based on the text input, a description parameter associated with the image;
   determining, based on the description parameter, a cluster including a portion related to the description parameter of the image to be modified, wherein the cluster includes the portion and at least one object from the image, which are co-related;
   modifying the portion of the image based on the description parameter; and
   displaying the image including the modified portion on the electronic device,
   wherein modifying the portion of the image comprises:
   generating a first descriptor for the cluster;
   generating a second descriptor using the description parameter associated with the image;
   determining a loss factor by differentiating the first descriptor and the second descriptor;
   modifying at least one visual parameter associated with the portion of the image to reflect a description of the text input, based on the determined loss factor, when the loss factor is less than a loss threshold; and
   providing a back propagation of the loss factor to image pixels to regenerate the first descriptor for the cluster, when the loss factor is greater than or equal to the loss threshold.

2. The method of claim 1, wherein the description parameter associated with the image comprises at least one of:
   a hashtag,
   a voice input,
   a contextual parameter,
   an image description,
   a symbol,
   an emoticon, and
   a tagged location.

3. The method of claim 1, wherein the cluster is determined based on the description parameter, and
   wherein the portion of the image is co-related to the description parameter.

4. The method of claim 1, wherein generating the first descriptor for the cluster comprises:
   identifying the cluster including portions which are visually co-related;
   determining a vector representation for a description of the cluster; and
   generating the first descriptor for the cluster based on the vector representation.

5. The method of claim 4, wherein identifying the cluster including the portions which are visually co-related comprises:
   determining the portion and the at least one object from the image based on the description parameter; and
   determining a spatial relationship between at least one of two portions of the portions of the image and the at least one object from the image.

6. The method of claim 1, wherein generating the second descriptor using the description parameter associated with the image comprises:
   determining visual attributes associated with the image using at least one of the image, an image driven natural language processing (NLP), and contextual parameters associated with the image, wherein the visual attributes associated with the image are modified based on the description parameter; and
   generating the second descriptor using the visual attributes associated with the image to be modified based on the description parameter.

7. The method of claim 1 wherein the first descriptor is regenerated for the cluster comprising the at least one portion of the plurality of portions in the image to be modified by:
   re-modifying the cluster based on the description parameter and the back propagated loss factor; and
   re-generating the first descriptor for the cluster based on the vector representation.

8. The method of claim 1, wherein modifying the portion of the image further comprises at least one of:
adding a first object related to the description parameter;
removing a second object based on the description parameter; and
replacing a third object based on the description parameter.

9. An electronic device, comprising:
a display;
a memory; and
a processor operatively coupled to the memory and configured to:
receive, from a user of the electronic device, a text input associated with an image displayed on the display;
determine, based on the text input, a description parameter associated with the image;
determine, based on the description parameter, a cluster including a portion related to the description parameter of the image to be modified, wherein the cluster includes the portion and at least one object from the image, which are co-related;
modify the portion of the image based on the description parameter by generating a first descriptor for the cluster, generating a second descriptor using the description parameter associated with the image, determining a loss factor by differentiating the first descriptor and the second descriptor, modifying at least one visual parameter associated with the portion of the image to reflect a description of the text input, based on the determined loss factor, when the loss factor is less than a loss threshold, and
providing a back propagation of the loss factor to image pixels to regenerate the first descriptor for the cluster, when the loss factor is equal to or greater than the loss threshold; and
display the image including the modified portion on the display.

10. The electronic device of claim 9, wherein the description parameter associated with the image comprises at least one of:
a hashtag;
a voice input;
a contextual parameter;
an image description;
a symbol;
an emoticon; and
a tagged location.

11. The electronic device of claim 9, wherein the cluster is determined based on the description parameter, and
wherein the portion of the image is co-related to the description parameter.

12. The electronic device of claim 9, wherein the processor is further configured to:
identify the cluster including portions which are visually co-related;
determine a vector representation for a description of the cluster; and
generate the first descriptor for the cluster based on the vector representation.

13. The electronic device of claim 12, wherein the processor is further configured to:
determine the portion and the at least one object from the image based on the description parameter; and
determine a spatial relationship between at least one of two portions of the portions and the at least one object from the image.

14. The electronic device of claim 9, wherein the processor is further configured to:
determine visual attributes associated with the image using at least one of: the image, an image driven natural language processing (NLP), and contextual parameters associated with the image, wherein the visual attributes associated with the image are modified based on the description parameter; and
generate the second descriptor using the visual attributes associated with the image to be modified based on the description parameter.

15. The electronic device of claim 9 wherein the processor is configured to:
re-modify the cluster based on the description parameter and the back propagated loss factor; and
re-generate the first descriptor for the cluster based on the vector representation.

16. The electronic device of claim 9, wherein the processor is further configured to modify the portion of the image based on the description parameter by performing at least one of:
adding a first object related to the description parameter;
removing a second object based on the description parameter; and
replacing a third object based on the description parameter.

* * * * *